(12) United States Patent
Akashi et al.

(10) Patent No.: US 8,068,270 B2
(45) Date of Patent: Nov. 29, 2011

(54) PARTICLES FOR DISPLAY, PARTICLE DISPERSION FOR DISPLAY, DISPLAY MEDIUM AND DISPLAY DEVICE

(75) Inventors: Ryojiro Akashi, Kanagawa (JP);
Daisuke Nakayama, Kanagawa (JP);
Jun Kawahara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 99 days.

(21) Appl. No.: 12/550,842

(22) Filed: Aug. 31, 2009

(65) Prior Publication Data
US 2010/0245982 A1    Sep. 30, 2010

(30) Foreign Application Priority Data
Mar. 26, 2009 (JP) .................. 2009-076662

(51) Int. Cl.
*G02B 26/00* (2006.01)
(52) U.S. Cl. ........................ 359/296

(58) Field of Classification Search .............. 359/665, 359/228, 290–291, 296, 666; 345/84, 105–107; 204/450, 600; 430/32, 34, 38; 252/582, 252/586
See application file for complete search history.

(56) References Cited

U.S. PATENT DOCUMENTS

| 3,668,106 A * | 6/1972 | Ota .............................. 358/305 |
| 4,806,443 A | 2/1989 | Yanus et al. |
| 6,295,167 B1 * | 9/2001 | Uematsu et al. .............. 359/665 |
| 2002/0146572 A1 | 10/2002 | Yanagisawa |

FOREIGN PATENT DOCUMENTS

| JP | A-2002-212423 | 7/2002 |
| JP | A-2003-91024 | 3/2003 |
| JP | A-2003-156768 | 5/2003 |
| JP | B2-3936588 | 6/2007 |

* cited by examiner

*Primary Examiner* — Scott J Sugarman
*Assistant Examiner* — Tuyen Tra
(74) *Attorney, Agent, or Firm* — Oliff & Berridge, PLC

(57) ABSTRACT

Particles for display including a colorant, a first polymer gel having a charging group and a second polymer compound having a hydrophilic group, the first polymer gel and the second polymer compound forming an IPN structure or a semi-IPN structure.

20 Claims, 5 Drawing Sheets

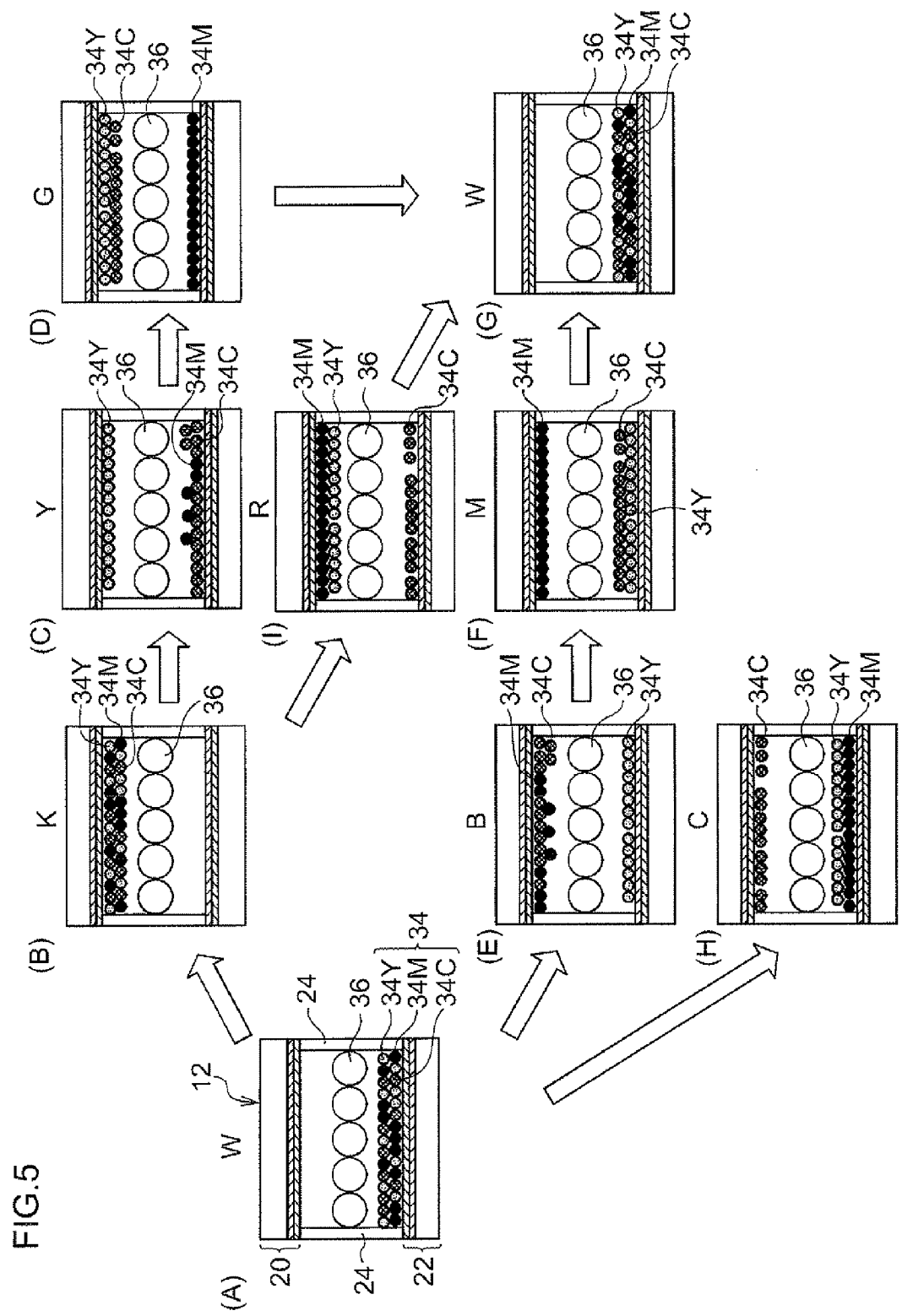

US 8,068,270 B2

PARTICLES FOR DISPLAY, PARTICLE DISPERSION FOR DISPLAY, DISPLAY MEDIUM AND DISPLAY DEVICE

CROSS-REFERENCE TO RELATED APPLICATION

This application is based on and claims priority under 35 USC 119 from Japanese Patent Application No. 2009-076662 filed Mar. 26, 2009.

BACKGROUND

The invention relates to particles for display, a particle dispersion for display, a display medium and a display device.

RELATED ART

In these days, studies on electrophoretic display device as a display having a memory property have been intensely conducted. In this display system, an electrophoretic material including charged color particles (electrophoretic particles) dispersed in a liquid is included in a cell formed by a pair of electrode substrates, and the display is performed by the electrophoresic particles that alternately move in the cell toward the display side and the rear side, upon application of an electric field.

In this technique, the electrophoretic material is a critical element and has been developed from various technical aspects. Further, there is a demand for a material for the liquid for dispersing the particles that is less volatile and highly safe as a chemical substance. Examples of such materials include isoparaffin-based hydrocarbon solvents that are petrol-derived and have a high boiling point (such as ISOPER series from Exxon Mobil Corporation), silicone oil and fluorine-based solvents. Therefore, there is a need for a material that exhibits excellent charging properties or electrophoretic properties in these kinds of liquid. In particular, silicon oil is considered to be highly safe and useful due to its low degrees of volatility and flammability.

SUMMARY

A first aspect of the invention provides particles for display including a colorant, a first polymer gel having a charging group and a second polymer compound having a hydrophilic group, the first polymer gel and the second polymer compound forming an IPN structure or a semi-IPN structure.

BRIEF DESCRIPTION OF THE DRAWINGS

Exemplary embodiments of the present invention will be described in detail based on the following figures, wherein:

FIG. 5 is a schematic view showing the relationship between the mode of voltage applied between the substrates of the display medium and the mode of movement of particles.

DETAILED DESCRIPTION

Figure 1:
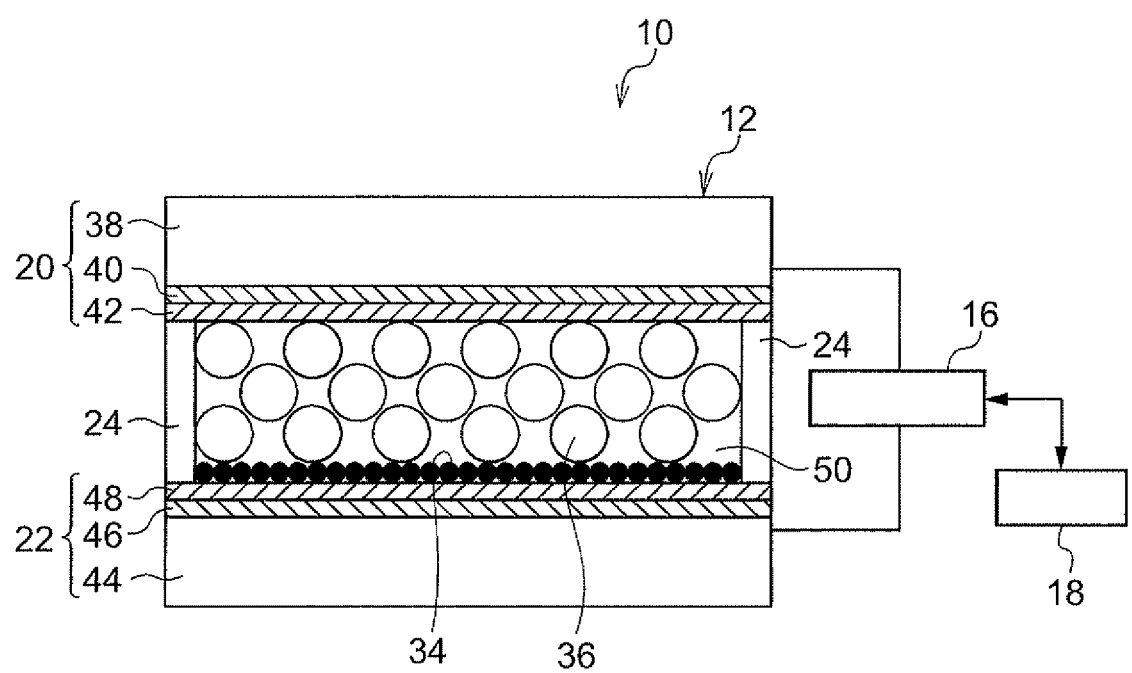
FIG. 1 is a schematic view of a display device according to a first exemplary embodiment of the invention.

In the following, details of the present invention will be described.

<Particles for Display and Particle Dispersion for Display>

The particle dispersion for display according to the invention includes particles for display (electrophoretic particles) and a dispersing medium for dispersing the particles. The particles for display (particles for display according to the invention) include a colorant, a first polymer gel having a charging group, and a second polymer compound having a hydrophilic group. The first polymer gel and the second polymer compound form an IPN structure or a semi-IPN structure.

The particles for display are colored polymer gel particles that absorb a dispersing medium such as isoparaffin or silicone oil and swell. The second polymer compound may be a polymer gel.

The polymer gel here refers to a polymeric, crosslinked material that is swollen with a dispersing medium absorbed therein. Whether or not the first polymer gel or the second polymer compound is in the form of a polymer gel can be analyzed by the following process.

First, the polymer compound as prepared is dispersed in a good solvent (dispersing medium) that serves as a component of the polymer gel. This is stirred over a sufficient time, and then its gelled form is optically observed with a microscope. If a gel is formed, it is determined that the polymer compound is insoluble in the solvent and is swollen. If a gel is not formed, it is determined that the polymer compound is soluble in the solvent and forms a solution. In this way, whether or not the polymer compound forms a gel can be determined from its appearance by observing using a microscope.

It is also possible to determine whether or not the polymer compound forms a gel by known methods, including those based on the difference in thermal properties such as a glass transition temperature or a thermal decomposition temperature.

As mentioned above, in the particles for display according to the invention, the first polymer gel and the second polymer compound form an IPN structure or a semi-IPN structure. In the invention, the IPN structure refers to a state that the first polymer gel and the second polymer compound in the form of a gel form a structure of interpenetrating polymer networks. Further, the semi-IPN structure refers to a state that the first polymer gel and the second polymer compound not having a crosslinked structure (i.e., not a polymer gel) form a structure of interpenetrating polymer networks. The interpenetrating polymer networks refer to a structure in which two or more kinds of polymer components are crosslinked and entangled with each other.

In particular, when a nonpolar solvent such as a silicone-based solvent is used for the electrophoretic material (particles for display), since dissociation of acid and base of the charging group does not progress, it is difficult to impart the electrophoretic material with a positive or negative charge polarity. Moreover, it is difficult to obtain a high degree of charging property. Therefore, there is a technique of designing the nonpolar solvent so as to function substantially as a polar solvent by adding a polar additive to the solvent. Namely, the polar additive is added in order to achieve a charging property of the electrophoretic particles. In this technique, however, the additive may deteriorate the memory property of the electrophoretic material, or degradation of the additive may affect the electric characteristics or durability of the electrophoretic material.

Further, there is a problem in that the electrophoretic material (particles for display) may aggregate and deteriorate its dispersibility.

The particles for display according to the invention are particles that move in response to an electric field. The particles for display have a charging property when dispersed in a dispersing medium, and move in the dispersing medium in response to an electric field. Further, by producing the particles for display (or particle dispersion for display) without using a polar additive that has been conventionally used, dispersibility and charging property of the particles can be improved as compared to the case in which the particles do not include a second polymer compound having a hydrophilic group. Therefore, electrophoretic particles (particles for display) having a sufficient level of charging property and improved stability can be provided.

In the following, particles for display according to the invention will be described.

(First Polymer Gel)

The first polymer gel used in the particles for display according to the invention will be described. The first polymer gel may include an additive.

Examples of the polymer gel that may be used as the first polymer gel include a crosslinked product (polymer gel) of a homopolymer formed from a monomer selected from the following group, or a crosslinked product (polymer gel) of a copolymer formed from two or more kinds of monomers selected from the following group. The polymer gel mentioned here has a property of forming a swollen material that is insoluble in the dispersing medium, as described later. Other examples of the polymer gel than the aforementioned homopolymer or copolymer formed from a monomer described in the following monomer group include a crosslinked product of polyester-based polymer, a crosslinked product of polyvinyl acetal derivative, a crosslinked product of polyurethane-based polymer, a crosslinked product of polyurea-based polymer, a crosslinked product of polyether-based polymer, a crosslinked product of polyamide-based polymer, and a crosslinked product of polycarbonate-based polymer.

-Monomer Group-

Examples of the monomer include (meth)acrylonitrile, alkyl(meth)acrylate, alkyl(meth)acrylate having an aromatic substituent, (meth)acrylate monomer having a silicone chain, (meth)acrylamide, ethylene, propylene, butadiene, isoprene, isobutylene, N-dialkyl-substituted (meth)acrylamide, N-alkyl-substituted (meth)acrylamide, vinylpyridine, vinylamine, allylamine, styrene, vinylcarbazole, N-vinyl pyrrolidone, styrene, styrene derivative, ethylene glycol di(meth)acryltate, glyceryl(meth)acrylate, polyethylene glycol mono (meth)acrylate, vinyl chloride, vinylidene chloride, ethylene glycol di(meth)acrylate, methylene bisacrylamide, isoprene and butadiene. In the invention, the description "(meth)acrylate" or the like refers to both acrylate and methacryltate.

When a polymer gel is formed during the polymerization reaction, the following polyfunctional monomers that are also a crosslinked monomer may be used: ethylene glycol di(meth)acrylate, diethylene glycol di(meth)acrylate, butanediol di(meth)acrylate, hexanediol di(meth)acrylate, silicone-based polyfunctional (meth)acrylate monomers (such as XX-22-164 XX-22-164, XX-22-164AS, XX-22-164A, XX-22-164B, XX-22-164C and XX-22-164E, trade name, manufactured by Shin-Etsu Chemical Co., Ltd.), methyelene bisacrylamide, allyl(meth)acrylate, divinyl benzene, and the like.

Monomer Having a Charging Group

The first polymer gel includes a charging group such as an acid group (or a salt thereof) or a base (or a salt thereof).

Examples of the monomer used for copolymerization in order to impart a charging property to the first polymer gel include a monomer having a charging group such as an amino group or an acid group (charging functional group). Among these functional groups, an amino group is preferably used as a salt obtained by reaction with an acid or as a quaternary ammonium compound obtained by reaction with an alkyl halide or a tosylate. In this case, the treatment may be conducted to the monomer or to a product obtained after the polymerization.

Example of the monomer having a charging group include a monomer having an amino group, a quaternary ammonium group, an acid group or an acid base, such as dimethylaminoethyl(meth)acrylate, diethylaminoethyl(meth)acrylate, dimethylaminopropyl(meth)acrylamide, vinyl pyridine, vinylamine, allylamine or a quaternary ammonium salt of these monomers, meth(acrylic) acid or a salt thereof, maleic acid, (meth)acrylamide-2-methyl propane sulfonic acid or a salt thereof, and vinyl sulfonic acid or a salt thereof. In particular, a quaternary ammonium salt is preferred and specific examples thereof include a tetraalkylammonium halide salt, a tetraalkylammonium sulfonate, and a tetraalkylammonium tetraphenylborate. Examples of the salt of an acid include an ammonium salt of carboxylic acid, sulfonic acid or phosphoric acid.

In the invention, the first polymer gel can be obtained by polymerizing a monomer selected from the aforementioned monomer group, for example, by using a crosslinkable monomer to cause gelation during polymerization. The first polymer gel may also be obtained without using a crosslinkable monomer at the time of polymerization, but applying radiation rays such as UV rays or electron beams or heat to the obtained polymer with the addition of optional crosslinking agent. Known compounds such as a polyfunctional isocyanate compound, a polyfunctional epoxy compound, or a melamine compound can be used as the crosslinking agent.

In the invention, suitable examples of the polymer gel include a crosslinked silicone-based polymer or a crosslinked long chain alkyl-based polymer. Details of these polymers are described below.

Crosslinked Silicone-Based Polymer

One suitable example of the crosslinked silicone-based polymer is a copolymer formed from the following components (A: silicone chain component, B: charging component, C: other copolymerization component).

A: Silicone Chain Component

Examples of the silicone chain component include a dimethylsilicone monomer having a (meth)acrylate group at one end thereof (for example, monofunctional monomers such as SILAPLANE FM-0711, FM-0721 and FM-0725, trade name, manufactured by Chisso Corporation, X-22-174DX, X-22-2426 and X-22-2475, trade name, manufactured by Shin-Etsu Chemical Co., Ltd., RMS-044, RMS-033 and RMS-083, trade name, manufactured by Gelest Inc., and other monomers such as XX-22-164, XX-22-164AS, X-22-164A, XX-22-164B, XX-22-164C and XX-22-164E, trade name, manufactured by Shin-Etsu Chemical Co., Ltd., and DMS-R05, DMS-R11, DMS-R18, DMS-R22, DMS-R31, DMS-U22, DBE-U12, DBE-U22 and SIB1400, trade name, manufactured by Gelest Inc.)

B: Charging Component

Examples of the charging component include the monomer having a charging group as mentioned above.

C: Other Polymerization Component

As necessary, other copolymerization component capable of copolymerization may be added. Examples thereof include alkyl(meth)acrylates such as methyl(meth)acrylate, ethyl (meth)acrylate, propyl(meth)acrylate and butyl(meth)acrylate, hydroxyethyl(meth)acrylate, hydroxybutyl(meth)acrylate, monomers having an ethylene oxide unit, including alkyloxyoligoethylene glycol(meth)acrylate such as tetraethylene glycol monomethyl ether(meth)acrylate, polyethylene glycol having a (meth)acrylate group at one end thereof, and the aforementioned crosslinkable monomers.

Among the above, A: silicone chain component and B: charging component are essential components, while C: other component is optionally included. The copolymerization ratio of A: silicone chain component is preferably 20% by weight or more, more preferably 50% by weight or more. The copolymerization ratio of B: charging component is preferably from 1% by weight to 50% by weight.

The gelation of the polymer due to crosslinking reaction may be achieved by, as mentioned above, a method of causing gelation during the polymerization using a crosslinkable monomer or the like, or by a method of applying radiation rays such as UV rays or electron beams or heat to the obtained polymer with the addition of optional crosslinking agent.

Examples of the silicone monomers include a dimethylsilicone monomer having a (meth)acrylate group at one end thereof (a silicone compound represented by the following Formula 1, such as SILAPLANE FM-0711, FM-0721 and FM-0725, trade name, manufactured by Chisso Corporation; and X-22-174DX, X-22-2426 and X-22-2475, trade name, manufactured by Shin-Etsu Chemical Co., Ltd.)

Formula 1

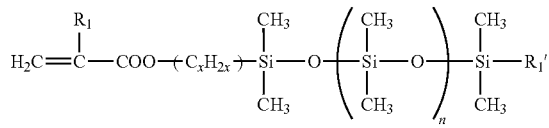

In Formula 1, $R_1$ represents a hydrogen atom or a methyl group, $R_1'$ represents a hydrogen atom or an alkyl group having 1 to 4 carbon atoms, n represents a natural number of from 1 to 1000, for example, preferably from 3 to 100, and x represents an integer of from 1 to 3.

Crosslinked Long Chain Alkyl-Based Polymer

The crosslinked long chain alkyl-based polymer has a similar structure to the aforementioned silicone-based copolymer, for example, a copolymer obtained by using a long chain alkyl(meth)crylate as A': long chain alkyl component instead of A: silicone chain component, B: charging component, and C: other copolymerization component. Specific examples of the long chain alkyl(meth)acrylate include those having an alkyl chain of 4 carbon atoms or more, such as butyl(meth) acrylate, hexyl(meth)acrylate, 2-ethylhexyl(meth)acrylate, dodecyl(meth)acrylate, and stearyl(meth)acrylate. The composition ratio of A': long chain alkyl component, B: charging component are essential components and C: other component may be selected from the range as described in the above silicone-based polymer, i.e., the copolymerization ratio of A': long chain alkyl component is preferably 20% by weight or more, more preferably 50% by weight or more, while the copolymerization ratio of B: charging component is preferably from 1% by weight to 50% by weight.

The long chain alkyl-based polymer refers to, for example, a polymer having an alkyl chain of 4 to 30 carbon atoms in a side chain thereof.

-Preparation of First Polymer Gel (Polymerization Method)-

The first polymer gel is a crosslinked polymer, and this polymer may be prepared using the materials (monomers) as mentioned above, in accordance with the following combinations.

(1) Form a polymer from at least a monomer as mentioned in the above monomer group, a monomer having a charging group as mentioned above, and a crosslinking agent. The crosslinking agent may be a polyfunctional monomer such as ethylene glycol(meth)acrylate, hexamethylene glycol di(meth)acrylate, divinylbenzene, allyl(meth)acrylate or methylene bisacrylamide, or the aforementioned polyfunctional monomer. In this case, the polyfunctional monomer as the crosslinking agent is preferably added in an amount of from 0.01 to 90% by weight with respect to the total amount of the monomers.

(2) Form a polymer using the aforementioned polyfunctional monomer as a main component. The "main component" here refers to a component of the polymer gel used at the largest amount. For example, a silicone-based polymer gel can be prepared by polymerizing a silicone-based polyfunctional monomer as a main component and a monomer having a charging group.

When the particles for display according to the invention is prepared in accordance with the method as described later, a colorant is preferably added together with other components of the first polymer gel during the preparation of the first polymer gel.

(Colorant)

The colorant may be organic or inorganic pigments, oil-soluble dyes or the like. Examples of the colorant include a magnetic powder of magnetite, ferrite or the like, carbon black, titanium oxide, magnesium oxide, zinc oxide, copper phthalocyanine-based cyan colorant, azo-based yellow colorant, azo-based magenta colorant, quinacridone-based magenta colorant, red colorant, green colorant, and blue colorant. Specific examples thereof include aniline blue, calco oil blue, chrome yellow, ultramarine blue, DuPont oil red, quinoline yellow, methylene blue chloride, phthalocyanine blue, malachite green oxalate, lamp black, rose bengal, C.I. pigment red 48:1, C.I. pigment red 122, C.I. pigment red 57:1, C.I. pigment yellow 97, C.I. pigment blue 15:1, C.I. pigment blue 15:3. Further, porous, sponge-like particles or hollow particles including air may also be used as white particles. Other known dyes may also be used as the colorant.

(Second Polymer Compound)

In the following, the second polymer compound having a hydrophilic group will be described.

As mentioned above, the first polymer gel and the second polymer compound preferably form an IPN structure or a semi-IPN structure in which these compounds are entangled with each other at a polymer network level. When the second polymer compound is a polymer gel, an IPN structure is formed, while when the second polymer does not have a crosslinked structure (i.e., not a polymer gel), a semi-IPN structure is formed.

One example of the second polymer compound is a copolymer formed from a monomer selected from the aforementioned monomer group that is used for the first polymer gel, and a monomer having a hydrophilic group. The second polymer compound preferably has a characteristic of dissolving in the dispersing medium to be described layer and swelling.

Among the monomers described in the aforementioned monomer group, an alkyl(meth)acrylate and a (meth)acrylate monomer having a silicone chain are preferably used.

Examples of the hydrophilic group include a hydroxyl group, a polyethylene glycol group, a carboxyl group and an amino group. Example of the monomer having a hydrophilic group include polyethylene glycol mono(meth)acrylate, hydroxyethyl(meth)acrylate, hydroxybutyl(meth)acrylate, glyceryl(meth)acrylate, (meth)acrylic acid, maleic acid, dimethylaminoethyl(meth)acrylate, diethylaminoethyl(meth)acrylate, (meth)acrylamide, and dimethylaminopropyl(meth)acrylamide.

It is also possible to copolymerize an alkyl(meth)acrylate of various kinds, styrenes or the like at a predetermined composition. In order to form an IPN structure, a polyfunctional monomer that may be used in the first polymer gel is preferably used as a crosslinking agent.

The monomer having a hydrophilic group is preferably used as a copolymerization component in an amount of from 0.1 to 50% by weight in the second polymer compound.

When the second polymer compound does not have a crosslinked structure (when a semi-IPN structure is formed), the weight average molecular weight of the second polymer compound is preferably 10,000 or more. When the weight average molecular weight is 10,000 or more, a stable composite of the first polymer gel and the second polymer compound can be formed, and stable characteristics can be obtained since the second polymer compound does not easily elute off from the first polymer gel.

(Preparation of Particles for Display)

In the following, the preparation method of particles for display according to the invention will be described.

When the particles for display according to the invention has a semi-IPN structure (i.e., the second polymer compound does not have a crosslinked structure), the particles for display can be prepared by a method including impregnating the first polymer gel including a colorant obtained by the aforementioned process, raw materials for the second polymer compound (such as a monomer selected from the aforementioned monomer group used for the first polymer gel or a monomer having a hydrophilic group), an optional solvent (a dispersing medium as described later), and an initiator; polymerizing these components after the impregnation; and removing an unreacted monomer or the like by washing or the like after the polymerization.

When the particles for display according to the invention has an IPN structure, a crosslinking agent is further included in the above process of impregnation and polymerization.

The particles for display according to the invention may have an excellent production suitability due to its semi-IPN structure. Further, the particles for display whose shape is closer to spherical can be readily obtained. As a result, particles for display having an excellent electrophoretic property can be obtained.

When the particles for display according to the invention has a semi-IPN structure, it is preferable that the first polymer gel and the second polymer compound are chemically bonded to each other. In this way, an even stronger entanglement can be achieved.

The above chemical bond can be achieved, for example, by a method of polymerizing the second polymer compound using a monomer having a reactive group (such as an epoxy group or an isocyanate group) as a raw material, while bonding this reactive group to a functional group on the surface of the first polymer gel (this functional group may serve as the group having a charging group).

The weight ratio of the first polymer gel/the second polymer compound is preferably from 50/1 to 1/10. The concentration of a colorant in the particles for display is preferably from 1 to 80% by weight with respect to the weight of the particles.

In the following, the particle dispersion for display according to the invention will be described.

(Solvent)

The particles for display dispersion according to the invention include the particles for display (electrophoretic particles) according to the invention and a dispersing medium in which the particles for display are dispersed.

Examples of the dispersing medium include hexane, cyclohexane, toluene, xylene, decane, hexadecane, kerosene, paraffin, isoparaffin, silicone oil, dichloroethylene, trichloroethylene, perchloroethylene, perfluoro ethers, high-purity petrol, ethylene glycol, ethers, esters, dimethylformamide, dimethylacetoamide, dimethylsulfoxide, propylene carbonate, ethylene carbonate, benzene, diisopropyl naphthalene, olive oil, isopropanol, trichlorotrifluoroethane, tetrachloroethane, dibromotetrafluoroethane, and a mixture thereof.

Among these, isoparaffin, silicone oil, and a mixture of isoparaffin or silicone oil and other solvent are preferably used.

Specific examples of the silicone oil include those having a hydrocarbon group bonded to a siloxane bond structure (such as dimethyl silicone oil, diethyl silicone oil, methylethyl silicone oil, methyl phenyl silicone oil and diphenyl silicone oil), modified silicone oil (such as fluorine-modified silicone oil, amine-modified silicone oil, carboxyl-modified silicone oil, epoxy-modified silicone oil and alcohol-modified silicone oil). Among these, dimethyl silicone oil is particularly preferred.

The viscosity of the silicone oil is preferably from 0.1 to 20 mPa·s, more preferably from 0.1 to 2 mPa·s, at a temperature of 20° C. The viscosity can be measured by a viscometer B-8L (trade name, manufactured by Tokyo Keiki Inc.)

Examples of the paraffin-based hydrocarbon solvent include normal paraffin-based hydrocarbons or isoparaffin-based hydrocarbons having carbon atoms of 20 or more (boiling point: 80° C. or more), but isoparaffin-based hydrocarbons are more preferred. Specific examples thereof include SHELLSOL 71 (trade name, manufactured by Showa Shell Sekiyu K.K.), ISOPAR O, ISOPAR H, ISOPAR K, ISOPAR L, ISOPAR G and ISOPAR M (trade name, manufactured by Exxon Mobile Corporation), and IP SOLVENT (trade name, manufactured by Idemitsu Kosan Company, Limited.)

The concentration of the particles for display in the particle dispersion for display according to the invention may be selected according to the display characteristics, response characteristics or applications thereof, but is preferably from 0.1 to 30% by weight. When particles having different colors are included in the dispersion, the total amount of the particles is preferably within this range.

In order to achieve color display, plural kinds of particles having different colors and charging properties may be used in combination.

The amount of liquid absorption of the particles for display according to the invention at an equilibrium and swollen state (the amount of dispersing medium absorbed by the particles for display) is preferably from 0.1 to 50 g/g, more preferably from 0.2 to 50 g/g, particularly preferably from 0.5 to 20 g/g.

The amount of liquid absorption at an equilibrium and swollen state can be measured by the following method, and the values described in the present specification are measured by this method. Specifically, the particles for display in a dried state (including no dispersing medium) are immersed in a dispersing medium at room temperature (22° C.) for 24 hours, and the weight of particles for display before and after the immersion is measured. Then, the ratio of the weight of dispersion medium with respect to the weight of dried particles for display is calculated from the amount of weight change as measured in view of the specific gravity of dispersing medium and particles for display.

The particle dispersion for display according to the invention may be used to an display medium employing an electrophoretic system, a photochromic medium (photochromic element) employing an electrophoretic system, a liquid toner employing a liquid development electrophotographic system, or the like. Further, the systems of an electrophoretic display medium or an electrophoretic photochromic medium (photochromic device) include a system in which particles move in a vertical direction with respect to the electrode (substrate), a system in which particles move in a horizontal direction (in-plane device), or a hybrid system in which these systems are combined.

<Display Medium and Display Device>

In the following, the display medium and the display device according to the invention will be described.

The display medium according to the invention includes a pair of substrates, at least one of the substrates being transparent, and the particle dispersion for display according to the invention that is positioned in a space between the pair of substrates.

The display device according to the invention includes the display medium according to the invention and a voltage applying unit that applies a voltage to the pair of substrates.

In the following, exemplary embodiments of the display medium and the display device according to the invention will be described with reference to the drawings.

First Exemplary Embodiment

Figure 2A:
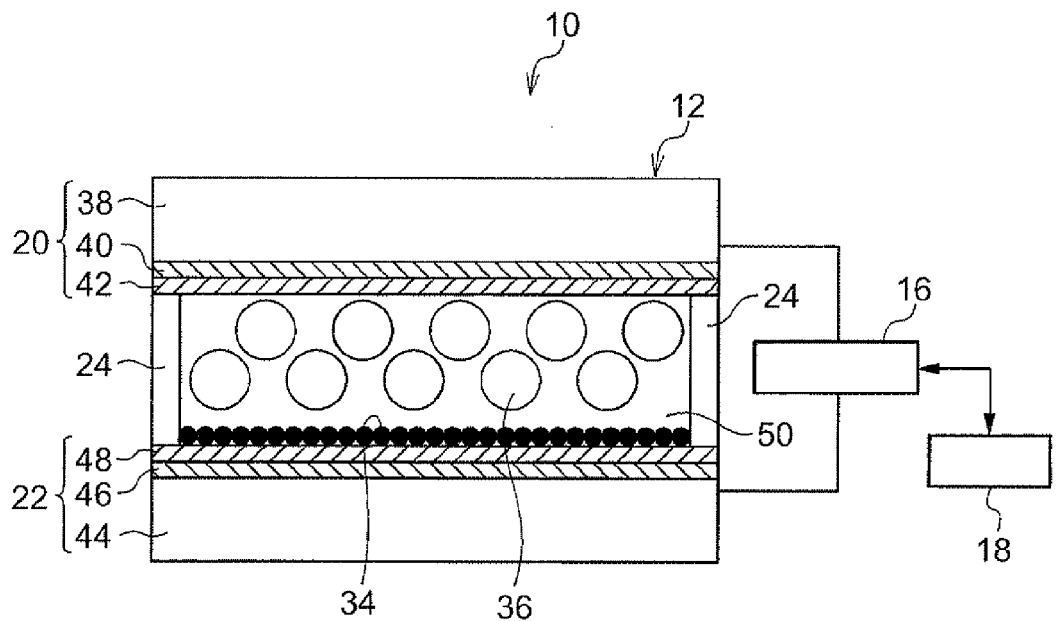
FIGS. 2A and 2B are schematic views showing how the particles move upon application of a voltage between the substrates of the display device according to the first exemplary embodiment of the invention.
Figure 2B:
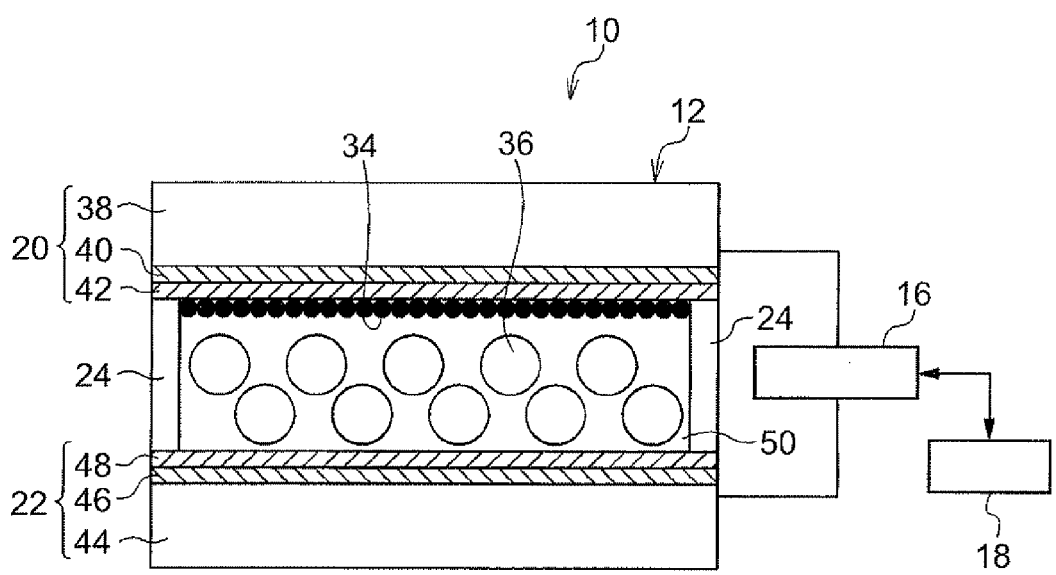

FIG. 1 is a schematic view of a display device according to the first exemplary embodiment. FIGS. 2A to 2C are schematic views showing how the particles move upon application of a voltage between the substrates of the display device according to the first exemplary embodiment of the invention.

Display device 10 according to the first exemplary embodiment includes display medium 12, and display medium 12 includes the particles for display dispersion according to the invention as dispersing medium 50 and particles 34.

Display device 10 includes, as shown in FIG. 1, a display medium 12, a voltage applying unit 16 that applies a voltage to display medium 12, and a controller 18.

Display medium 12 includes a display substrate 20 that displays an image; a rear substrate 22 that is positioned opposite to display substrate 20 with a space; spacers 24 that maintain the substrates to be positioned with a specified space and divide the space between the substrates into plural cells; particles 34 included in each cell; and large particles 36 having a different optical reflection property than that of particles 34.

The cell as mentioned above refers to a space surrounded by display substrate 20, rear substrate 22, and spacers 24. A dispersing medium 50 is enclosed in the cell. Particles 34 are dispersed in dispersing medium 50, and move between display substrate 20 and rear substrate 22 through the gaps among large particles 36 in response to an electric field formed in the cell.

In this exemplary embodiment, particles 34 enclosed in each cell are described as having a single color and are previously treated to be either positively or negatively charged.

It is also possible to design display medium 12 so that the display can be performed at each pixel, by providing spacers 24 to form a cell so as to correspond to each pixel of an image to be displayed.

For the purpose of simplification, this exemplary embodiment is described by referring to a drawing that shows only a single cell. In the following, details of each component will be described.

Display substrate 20 includes, on a support 38, a front electrode 40 and a surface layer 42 in this order. Rear substrate 22 includes, on a support 44, a rear electrode 46 and a surface layer 48 in this order.

Only display substrate 20, or both display substrate 20 and rear substrate 22 are transparent. In this exemplary embodiment, being transparent refers to having a transmittance with respect to visible rays of 60% or more.

Materials for support 38 and support 44 include glass and plastics such as polyethylene terephthalate resin, polycarbonate resin, acrylic resin, polyimide resin, polyester resin, epoxy resin, and polyether sulfone resin.

Materials for front electrode 40 and rear electrode 46 include oxides of indium, tin, cadmium, antimony or the like, composite oxides such as ITO, metals such as gold, silver, copper or nickel, and organic materials such as polypyrrole or polythiophene. Front electrode 40 and rear electrode 46 may be obtained by forming a material such as those into a single film, a mixed film or a composite film, by a method such as evaporation, sputtering or coating. The thickness of front electrode 40 and rear electrode 46 is typically from 100 to 2,000 angstroms when these electrodes are formed by evaporation or sputtering. Front electrode 40 and rear electrode 46 may be formed in a desired patterned manner by a known method such as etching that is performed to form conventional liquid crystal displays or printed boards. For example, front electrode 40 and rear electrode 46 may be formed in a matrix pattern or a striped pattern that enables passive matrix driving.

Front electrode 40 may be embedded in support 38, or rear electrode 46 may be embedded in support 44. In this case, the material for supports 38 and 44 is selected in accordance with the composition of each kind of particles 34.

Front electrode 40 and rear electrode 46 may be positioned outside display medium 12, separate from display substrate 20 and rear substrate 22, respectively.

In the above description, both display substrate 20 and rear substrate 22 are provided with an electrode (front electrode 40 and rear electrode 46). However, it is also possible to provide an electrode only to one substrate for performing active matrix driving.

In order to enable active matrix driving, a thin film transistor (TFT) may be provided to support 38 and support 44 to each pixel. The TFT is preferably formed on rear substrate 22 rather than on display substrate 20, for ease of forming a multilayer wiring or packaging.

When front electrode 40 and rear electrode 46 are formed on support 38 and support 44, respectively, dielectric films as surface layers 42 and 48 may be formed on front electrode 40 and rear electrode 46, respectively.

Materials for surface layers 42 and 48 include polycarbonate, polyester, polystyrene, polyimide, epoxy, polyisocyanate, polyamide, polyvinyl alcohol, polybutadiene, polymethylmethacrylate, copolymerized nylon, UV-cured acrylic resin, and fluorocarbon resin.

Other than the aforementioned insulating materials, an insulating material in which a charge transporting substance is included is also applicable.

Examples of the charge transporting substance include hole transporting substances such as hydrazone compounds, stilbene compounds, pyrazoline compounds, and arylamine compounds; and electron transporting substances such as fluorenone compounds, diphenoquinone compounds, pyrane compounds, and zinc oxide.

A self-supporting resin having a charge transporting property is also applicable. Specific examples thereof include polyvinyl carbazole, and a polycarbonate obtained by polymerizing a specific dihydroxyarylamine and bischloroformate, as described in the U.S. Pat. No. 4,806,443.

The material for the dielectric film is selected in accordance with the composition of the particles, or the like. Since display substrate 20 needs to be transparent, the surface layer of display substrate 20 is preferably formed from a transparent material.

Spacers 24 that maintain a space between display substrate 20 and rear substrate 22 are formed so as not to impair the transparency of display substrate 20, and are formed from thermoplastic resin, thermosetting resin, electron beam-curing resin, photo-curing resin, rubber, metal, or the like.

Spacers 24 may be formed in an integrated manner with either display substrate 20 or rear substrate 22. In this case, spacers 24 may be formed by subjecting support 38 or support 44 to an etching treatment, laser treatment, pressing treatment using a predetermined pattern, or printing treatment.

In this case, spacers 24 are formed on side of either display substrate 20 or rear substrate 22, or on both sides.

Spacers 24 may have a color or colorless, but is preferably colorless and transparent so as not to affect the image displayed on display medium 12. In this case, for example, spacers 24 are formed from a transparent polystyrene resin, polyester resin, or acrylic resin.

When spacers 24 are in the form of particles, glass particles may also be used for spacers 24, as well as particles of a transparent polystyrene resin, polyester resin, or acrylic resin.

Being transparent here refers to having a transmittance of 60% or more with respect to visible rays.

In the following, large particles 36 are described. Large particles 36 are particles that are not charged and have different optical reflection characteristics than that of particles 34, and function as a reflective member that displays a different color than that of particles 34. Further, reflective particle 36 function as a spacer which allows particles 34 to move through the space between display substrate 20 and rear substrate 22 without inhibiting the movement of particles 34. Namely, each particle of particles 34 moves through the gaps among large particles 36 from the side of rear substrate 22 toward the side of display substrate 20, or from the side of display substrate 20 toward the side of rear substrate 22. The color of large particles 36 may be selected so as to be a background color, such as white or black. In this exemplary embodiment, large particles 36 are described as white particles, but the color of large particles 36 is not limited thereto.

Large particles 36 may be, for example, formed by dispersing a white pigment such as titanium oxide, silicon oxide or zinc oxide in a resin such as polystyrene, polyethylene, polypropylene, polycarbonate, PMMA, acrylic resin, phenol resin, formaldehyde condensate, or the like. When large particles 36 have a color other than white, a pigment or dye of a desired color may be included in the resin particles. The pigment or dye may be known ones used in printing inks or color toners, such as RGB or YMC colors.

Large particles 36 may be included between the substrates by, for example, an inkjet method. When large particles 36 are fixed, heat (and pressure as necessary) is applied after the inclusion of large particle 36 to melt the surface of the particles, while maintaining the gaps between the particles.

The size of the cell in display medium 12 has a close relationship with the definition of display medium 12, and the definition of the image displayed by display medium 12 can be increased by reducing the size of the cell. The cell typically has a length in a plane direction of display substrate 20 of from 10 μm to 1 mm.

Display substrate 20 and rear substrate 22 can be fixed to each other via spacer 24 using a combination of bolt and nut, a clamp, a clip, a flame for fixing the substrates, or the like. Alternatively, the substrates may be fixed to each other using an adhesive, or by performing hot-melting, ultrasonic bonding, or the like.

Display medium 12 having the aforementioned structure is applicable to media that can record an image or re-writing an image, such as bulletin boards, circulars, electronic black boards, advertisements, billboards, flash signals, electronic paper, electronic newspapers, electronic books, and document sheets for use in both copiers and printers.

As mentioned above, the display device according to this exemplary embodiment includes display medium 12, voltage applying unit 16 that applies a voltage to display medium 12, and controller 18 (see FIG. 1).

Voltage applying unit 16 is electrically connected to front electrode 40 and rear electrode 46. In the following, both of front electrode 40 and rear electrode 46 are described as being electrically connected to voltage application 16. However, it is also possible that one of these electrodes is grounded while the other is electrically connected to voltage applying unit 16.

Voltage applying unit 16 is connected to controller 18 such that voltage applying unit 16 can send or receive signals.

Controller 18 may be a microcomputer including a CPU (central processing unit) that controls operation of the whole device, a RAM (random access memory) that temporarily records data of various kinds, and a ROM (read only memory) in which programs of various kinds, such as control program for controlling the whole device, are recorded.

Voltage applying unit 16 applies a voltage to front electrode 40 and rear electrode 46 in accordance with instructions from controller 18.

In the following, the function of display device 10 will be described in accordance with the operation of controller 18.

Particles 34 included in display medium 12 are described as black and negatively charged. Dispersing medium 50 is described as transparent, and large particles 36 are described as white. Namely, in this exemplary embodiment, display medium 12 displays a black color or a white color depending on the movement of particles 34.

First, an initial operation signal is output to voltage applying unit 16. This signal indicates application of a voltage for a specified time, such that front electrode 40 serves as a negative electrode and rear electrode 46 serves as a positive electrode. When a voltage that is negative and not less than a threshold voltage at which changes in concentration stops is applied between the substrates, particles 34 that are negatively charged move toward the side of rear substrate 22, and reach rear substrate 22 (see FIG. 2A).

At this time, the color of display medium 12 seen from the side of display substrate 20 is a white color of large particles 36.

The time T1 required for the above process may be recorded in advance in a memory such as a ROM (not shown) in controller 18 as information that indicates the time for voltage application in the initial operation, so that this information is read out upon execution of the operation.

Subsequently, when a voltage having a polarity opposite to the voltage that is previously applied between the substrate is applied between the electrodes such that front electrode 40 serves as a positive electrode and rear electrode 46 serves as a negative electrode, particles 34 move toward display substrate 20 to reach display substrate 20. At this time, the color of display medium 12 seen from the side of display substrate 20 is a black color of particles 34 (see FIG. 2B).

Second Exemplary Embodiment

Figure 3:
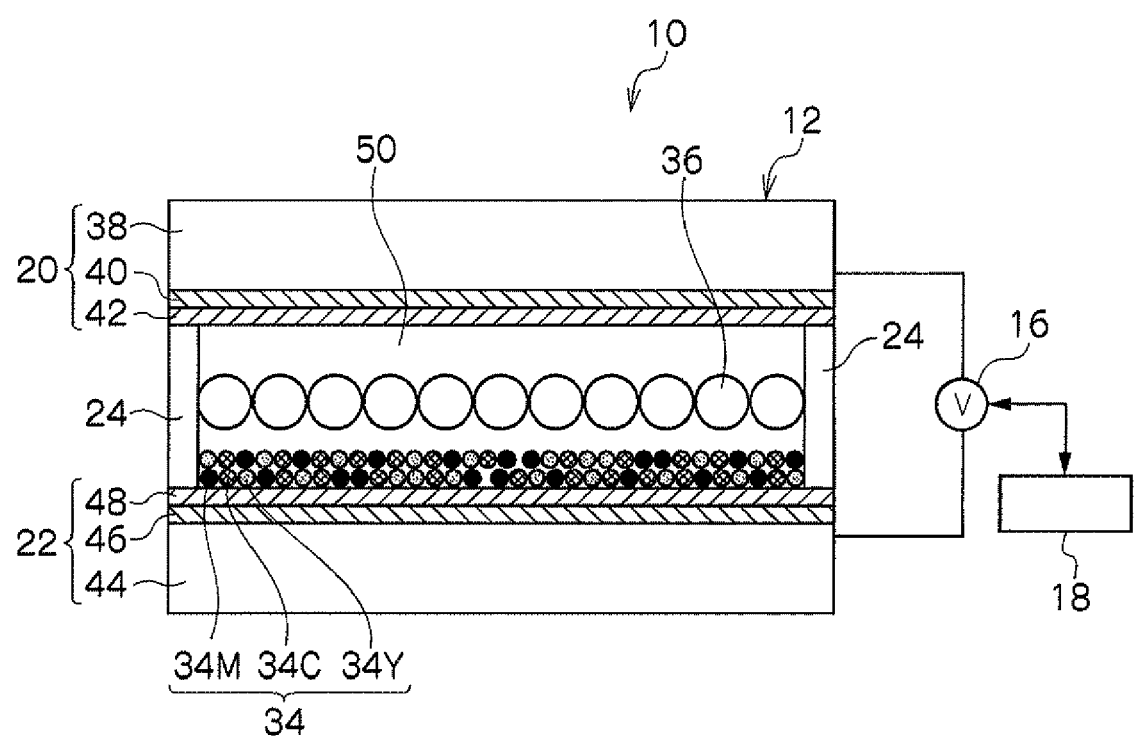
FIG. 3 is a schematic view of a display device according to a second exemplary embodiment of the invention.
Figure 4:
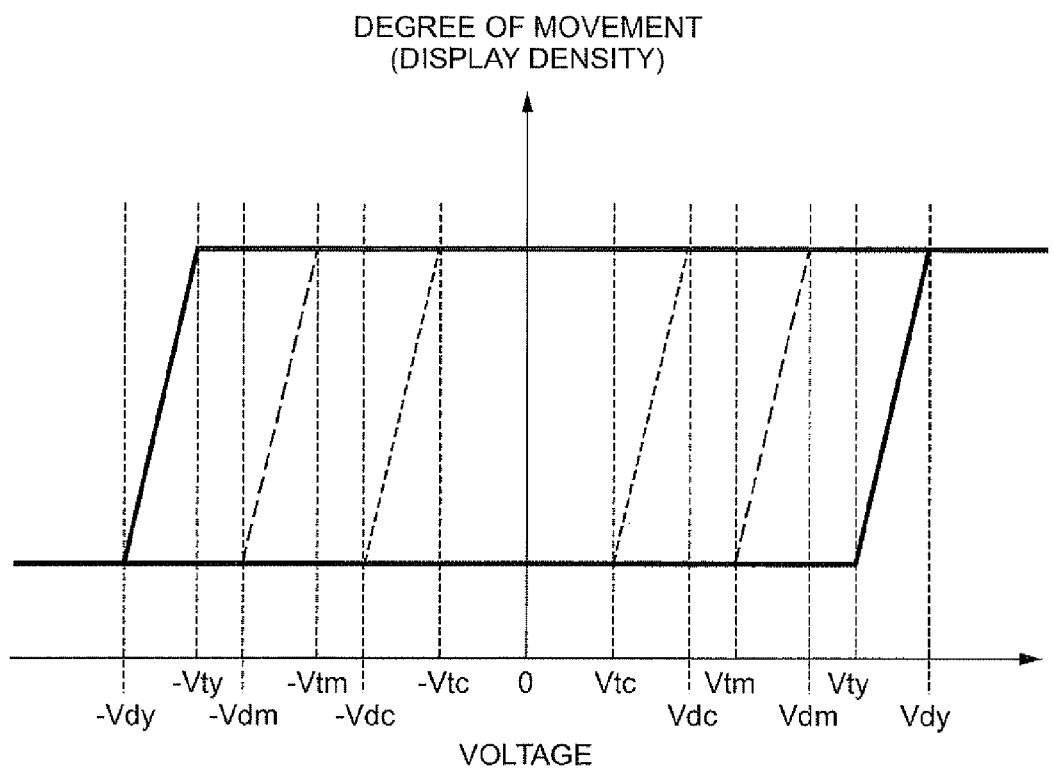
FIG. 4 is a diagram schematically showing the relationship between the voltage and the degree of movement of particles (display density)

In the following, a display device according to the second exemplary embodiment will be described. FIG. 3 is a schematic view of a display device according to the second exemplary embodiment of the invention, FIG. 4 is a diagram schematically showing the relationship between the voltage and the degree of movement of particles (display density), and FIG. 5 is a schematic view showing the relationship between the mode of voltage applied between the substrates of the display medium and the mode of movement of particles.

Display device 10 according to the second exemplary embodiment employs two or more kinds of mobile particles 34, and these two or more kinds of mobile particles 34 are charged to the same polarity.

Display device 10 according to this exemplary embodiment includes, as shown in FIG. 3, display medium 12, voltage applying unit 16 that applies a voltage to display medium 12, and controller 18.

Since display device 10 according to this exemplary embodiment has a similar structure to that of display device 10 according to the first exemplary embodiment, the same components are assigned the same reference numbers and detailed explanations thereof are omitted.

Display medium 12 include display substrate 20, rear substrate 22 that is positioned opposite to display substrate 20 with a gap therebetween, spacers 24 that retain these substrates to be positioned via a predetermined space and defines the space between the substrates into multiple cells, mobile particles 34 included in each cell, and large particles 36 having an optical reflection characteristics that is different from that of mobile particle 34.

The surfaces of display substrate 20 and rear substrate 22 facing each other are charge-treated as with the case of the first exemplary embodiment, and surface layers 42 and 48 are provided on each of the substrate surfaces.

In this exemplary embodiment, two or more kinds of mobile particles 34 having different colors are dispersed in dispersing medium 50.

In this exemplary embodiment, mobile particles 34 include yellow mobile particles 34Y having a yellow color, magenta mobile particles 34M having a magenta color and cyan mobile particles 34C having a cyan color. However, mobile particles 34 are not limited to these three colors.

Mobile particles 34 move between the substrates electrophoretically, and particles of different colors move in response to an electric field at different absolute values of voltage. Namely, yellow mobile particles 34Y, magenta mobile particles 34M and cyan mobile particles 34C move upon application of voltage in a range that is different from each other.

Mobile particles 34 including two or more kinds of particles that move in response to an electric field at different absolute values of voltage can be obtained by preparing particle dispersions each containing particles having different charge amounts, and then mixing these particle dispersions.

The charge amount of the particles can be adjusted by, for example, changing the amount of materials for mobile particles 34 as described in the first exemplary embodiment, such as a charge control agent, or changing the type or concentration of the resin that forms the particles.

As mentioned above, display medium 12 according to this embodiment includes three kinds of mobile particles 34 dispersed in dispersing medium 50, i.e., yellow mobile particles 34Y, magenta mobile particles 34M and cyan mobile particles 34C. Mobile particles 34 of different colors move in response to an electric field upon application of a voltage at different absolute values.

In this exemplary embodiment, the absolute value of voltage at which magenta mobile particles 34M start to move is defined as $|Vtm|$, the absolute value of voltage at which cyan mobile particles 34C start to move is defined as $|Vtc|$, and the absolute value of voltage at which yellow mobile particles 34Y start to move is defined as $|Vty|$, respectively. Further, the absolute value of maximum voltage at which substantially all of magenta mobile particles 34M move is defined as $|Vdm|$, the absolute value of maximum voltage at which substantially all of cyan mobile particles 34C move is defined as $|Vdc|$, and the absolute value of maximum voltage at which substantially all of yellow mobile particles 34Y move is defined as $|Vdy|$.

In the following, the absolute values of Vtc, −Vtc, Vdc, −Vdc, Vtm, −Vtm, Vdm, −Vdm, Vty, −Vty, Vdy and −Vdy satisfy the relationship of $|Vtc|<|Vdc|<|Vtm|<|Vdm|<|Vty|<|Vdy|$.

Specifically, as shown in FIG. 4, for example, mobile particles 34 of three kinds are charged to the same polarity and are dispersed in dispersing medium 50, and the range of absolute value of voltage at which cyan mobile particle 34C move $|Vtc \leq Vc \leq Vdc|$ (absolute values between Vtc and Vdc), the range of absolute value of voltage at which magenta mobile particles 34M move $|Vtm \leq Vm \leq Vdm|$ (absolute values between Vtm and Vdm), and the range of absolute value of voltage at which yellow mobile particles 34Y move $|Vty \leq Vy \leq Vdy|$ (absolute values between Vty and Vdy) are set in this order such that these ranges do not overlap each other.

Further, in order to move mobile particles 34 of each color independently from each other, the absolute value of maximum voltage at which substantially all of cyan mobile particles 34C move is less than the range of absolute value of voltage at which magenta mobile particles 34M move $|Vtm \leq Vm \leq Vdm|$ (absolute values between Vtm and Vdm) and the range of absolute value of voltage at which yellow mobile particles 34Y move $|Vty \leq Vy \leq Vdy|$ (absolute values between Vty and Vdy).

Moreover, the absolute value of maximum voltage at which substantially all of magenta mobile particles 34M move is less than the range of absolute value of voltage at which yellow mobile particles 34Y move $|Vty \leq Vy \leq Vdy|$ (absolute values between Vty and Vdy).

Therefore, in this exemplary embodiment, mobile particles 34 of each color can be independently driven by setting the ranges of voltage at which mobile particles 34 of each color move so as not to overlap each other.

The range of voltage at which mobile particles 34 move is from a voltage at which particles start to move to a voltage at which the display density stops to change (saturated) even when the amount of voltage and application time thereof are increased.

Further, the maximum voltage at which substantially all of mobile particles 34 move is a voltage at which the display density stops to change (saturated) even when the amount of voltage and application time thereof are increased since the start of movement.

The term "substantially all" includes the situation that part of mobile particles 34 of each color have different characteristics that do not contribute to the display characteristics due to variation in characteristics of mobile particles 34 of each color.

The "display density" refers to a density at which the density per unit of voltage stops changing (saturated), and is determined by measuring an optical density (OD) of color density at the display side, using a reflective densiometer manufactured by X-Rite, Incorporated, while applying a voltage and changing the voltage between the substrates in a direction of increasing the density as measured (increasing or decreasing the voltage for application) even when the amount of voltage and application time thereof are increased.

In display medium 12 according to this exemplary embodiment, when a voltage is applied between display substrate 20 and rear substrate 22 and gradually increased from 0V to exceed +Vtc, display density starts to change due to the movement of cyan mobile particles 34C. When the voltage is further increased to +Vdc, the display density due to the movement of cyan mobile particles 34C stops changing.

When the voltage is further increased to exceed +Vtm, display density starts to change due to the movement of magenta mobile particles 34M. When the voltage is further increased to +Vdm, the display density due to the movement of magenta mobile particles 34M stops changing.

When the voltage is further increased to exceed +Vty, display density starts to change due to the movement of yellow mobile particles 34Y. When the voltage is further increased to +Vdy, display density due to the movement of yellow mobile particles 34Y stops changing.

Conversely, when a voltage of minus polarity is applied between display substrate 20 and rear substrate 22 and the absolute value of the voltage is gradually increased from 0V to exceed −Vtc, display density starts to change due to the movement of cyan mobile particle 34C. When the absolute value of voltage is further increased to −Vdc, the display density due to the movement of cyan mobile particles 34C stops changing.

When the absolute value of minus voltage is further increased to exceed −Vtm, display density starts to change due to the movement of magenta mobile particles 34M. When the absolute value of voltage is further increased to −Vdm, the display density due to the movement of magenta mobile particles 34M stops changing.

When the absolute value of minus voltage is further increased to exceed −Vty, display density starts to change due to the movement of yellow mobile particles 34Y. When the absolute value of voltage is further increased to −Vdy, the display density due to the movement of yellow mobile particles 34Y stops changing.

Accordingly, in this exemplary embodiment, as shown in FIG. 4, when a voltage in a range of from −Vtc to +Vtc (|Vtc| or less) is applied between display substrate 20 and rear substrate 22, movement of cyan mobile particles 34C, magenta mobile particles 34M and yellow mobile particles 34Y does not occur at such a level that the display density in display medium 12 changes. When a voltage having an absolute value that is more than +Vtc or −Vtc is applied between the substrates, cyan mobile particles 34C (among cyan mobile particles 34C, magenta mobile particles 34M and yellow mobile particles 34Y) start to move at such a level that causes changes in display density in display medium 12, and when a voltage having an absolute value that is more than +Vdc or −Vdc is applied between the substrates, the display density per unit voltage stops changing.

Further, when a voltage in a range of from −Vtm to +Vtm (|Vtm| or less) is applied between display substrate 20 and rear substrate 22, movement of magenta mobile particles 34M and yellow mobile particles 34Y does not occur at such a level that the display density in display medium 12 changes. When a voltage having an absolute value that is more than +Vtm or −Vtm is applied between the substrates, magenta mobile particles 34M (among magenta mobile particles 34M and yellow mobile particles 34Y) start to move at such a level that causes changes in display density in display medium 12, and when a voltage having an absolute value of |Vdm| or more is applied between the substrates, the display density stops changing.

Further, when a voltage in a range of from −Vty to +Vty (|Vty| or less) is applied between display substrate 20 and rear substrate 22, movement of yellow mobile particles 34Y does not occur at such a level that the display density in display medium 12 changes. When a voltage having an absolute value that is more than +Vty or −Vty is applied between the substrates, yellow mobile particles 34Y start to move at such a level that causes changes in display density in display medium 12, and when a voltage having an absolute value of |Vdy| or more is applied between the substrates, the display density stops changing.

Subsequently, the mechanism of how the particles move when an image is displayed in display medium 12 will be described with reference to FIG. 5.

For example, display medium 12 includes yellow mobile particles 34Y, magenta mobile particles 34M and cyan mobile particles 34C as explained with reference to FIG. 4 as mobile particles 34 of plural kinds.

In the following, the voltage to be applied between the substrates that is more than an absolute value at which yellow mobile particles 34Y start to move but not more than a maximum voltage at which substantially all of yellow mobile particles 34Y move is referred to as "voltage L", the voltage to be applied between the substrates that is more than an absolute value at which magenta mobile particles 34M start to move but not more than a maximum voltage at which substantially all of magenta mobile particles 34M move is referred to as "voltage M", and the voltage to be applied between the substrates that is more than an absolute value at which cyan mobile particles 34C start to move but not more than a maximum voltage at which substantially all of cyan mobile particles 34C move is referred to as "voltage S".

When the voltage applied between the substrates is higher at the side of display substrate 20 than the side of rear substrate 22 is applied between the substrates, the above voltages are referred to as "+voltage L", "+voltage M" and "+voltage S", respectively. When the voltage applied between the substrates is higher at the side of rear substrate 22 than the side of display substrate 20, the above voltages are referred to as "−voltage L", "−voltage M" and "−voltage S", respectively.

As shown in FIG. 5, for example, all of magenta mobile particles 34M, cyan mobile particles 34C and yellow mobile particles 34Y are positioned at the side of rear substrate 22, and a white color is displayed at the initial state (see (A)). When +voltage L is applied between display substrate 20 and rear substrate 22 at this initial state, all of magenta mobile particles 34M, cyan mobile particles 34C and yellow mobile particles 34Y move to the side of display substrate 20. These particles remain at the side of display substrate 20 when the voltage application is stopped at this state, thereby exhibiting a black color formed by subtractive color mixing of magenta, cyan and yellow (see (B)).

Subsequently, when −voltage M is applied between display substrate 20 and rear substrate 22 in the state of (B), magenta mobile particles 34M and cyan mobile particles 34C move to the side of rear substrate 22. As a result, only yellow mobile particles 34Y remain at the side of display substrate 20, thereby exhibiting a yellow color (see (C)).

Further, when +voltage S is applied between display substrate 20 and rear substrate 22 in the state of (C), cyan mobile particles 34C move to the side of display substrate 22. As a result, yellow mobile particles 34Y and cyan mobile particles 34C are positioned at the side of display substrate 20, thereby exhibiting a green color formed by subtractive color mixing of cyan and yellow (see (D)).

When −voltage S is applied between display substrate 20 and rear substrate 22 in the state of (B), cyan mobile particles 34C move to the side of rear substrate 20. As a result, yellow mobile particles 34Y and magenta mobile particles 34M are positioned at the side of display substrate 20, thereby exhibiting a red color formed by subtractive color mixing of yellow and magenta (see (I)).

When +voltage M is applied between display substrate 20 and rear substrate 22 in the state of (A), magenta mobile particles 34M and cyan mobile particles 34C move to the side of display substrate 20. As a result, magenta mobile particles 34M and cyan mobile particles 34C are positioned at the side of display substrate 20, thereby exhibiting a blue color formed by subtractive color mixing of magenta and cyan (see (E)).

When −voltage S is applied between display substrate 20 and rear substrate 22 in the state of (E), cyan mobile particles 34C move to the side of rear substrate 22. As a result, only magenta mobile particles 34M are positioned at the side of display substrate 20, thereby exhibiting a magenta color (see (F)).

When −voltage L is applied between display substrate 20 and rear substrate 22 in the state of (F), magenta mobile particles 34M move to the side of rear substrate 22. As a result, no mobile particles are positioned at the side of display substrate 20, thereby exhibiting a white color of large particles 36 (see (G)).

When +voltage S is applied between display substrate 20 and rear substrate 22 in the initial state of (A), cyan mobile particles 34C move to the side of display substrate 20. As a result, cyan mobile particles 34C are positioned at the side of display substrate 20, thereby exhibiting a cyan color (see (H)).

When −voltage L is applied between display substrate 20 and rear substrate 22 in the state of (I), all of mobile particles 34 move to the side of rear substrate 22. As a result, no mobile particles are positioned at the side of display substrate 20, thereby exhibiting a white color of large particles 36 (see (G)).

Similarly, when −voltage L is applied between display substrate 20 and rear substrate 22 in the state of (D), all of mobile particles 34 move to the side of rear substrate 22. As a result, no mobile particles are positioned at the side of display substrate 20, thereby exhibiting a white color of large particles 36 (see (G)).

In this exemplary embodiment, a voltage corresponding to each kind of mobile particles 34 is applied between the substrates. Therefore, desired particles can be selectively moved in response to an electric field formed by the voltage, migration of particles of other colors in dispersing medium 50 can be suppressed, thereby suppressing mixing of an undesired color. As a result, a color can be displayed while suppressing image degradation of display medium 12.

A vivid color can be displayed as long as mobile particle 34 of different colors move upon application of a voltage having different absolute values, even if the ranges of the voltage overlap each other. However, when the ranges of voltage do not overlap each other, mixing of colors can be more suppressed and a more vivid color can be displayed.

Further, by dispersing mobile particles 34 of cyan, magenta and yellow in dispersing medium 50, colors of cyan, magenta, yellow, blue, red, green and black can be displayed and, for example, a white color can be displayed by using large particle 36 having a white color, thereby enabling the display of a specific color.

As mentioned above, in display device 10 according to this exemplary embodiment, the display can be performed by the movement of mobile particles 34 toward display substrate 20 or rear substrate 22.

EXAMPLES

In the following, the invention will be described in further details with reference to the Examples, but the invention is not limited thereto.

Comparative Example 1

Polymer gel particles having a blue color that include an acid group are prepared in accordance with the following process, and are evaluated. The polymer gel particles include stearyl methacrylate as a main component.

(Pigment Dispersion)

3.0 parts by weight of a blue pigment (CYANINE BLUE 3020, trade name, manufactured by Sanyo Color Works, Ltd.), 27 parts by weight of ISOPAR M (trade name, manufactured by Exxon Mobile Corporation) and 1.5 parts by weight of SOLSPERSE 17000 (trade name, manufactured by Lubrizol Advanced Materials Inc.) are mixed and stirred for 10 minutes using a supersonic pulverizer (UH-600S, trade name, manufactured by SMT Co., Ltd.) to disperse the pigment.

Subsequently, as a dispersing medium, a solution is prepared by mixing 2 parts by weight of polyvinyl pyrrolidone (molecular weight: 90K, manufactured by Wako Pure Chemical Industries, Ltd.) and 0.5 parts by weight of sodium dodecyl sulfate in 100 parts by weight of distilled water.

(Gel Particles)

5 parts by weight of the above pigment dispersion, 4 parts by weight of stearyl methacrylate, 1 part by weight of trihexyl amine salt of methacrylic acid, 0.1 part by weight of ethylene glycol dimethacrylate and 0.05 parts by weight of azobisdimethylvaleronitrile as an initiator (V-65, trade name, manufactured by Wako Pure Chemical Industries, Ltd.) are mixed, and this is further mixed in the above dispersing medium and stirred using a homogenizer to disperse the monomer droplets in a continuous phase of the aqueous solution. The solution is placed in a flask and the content thereof is thoroughly subjected to a nitrogen replacement, and is then allowed to polymerize while stirring with a rotor at 55° C. for 5 hours.

After the completion of polymerization, particles are recovered by filtering and washed with tetrahydrofuran (THF) and toluene. The volume average particles size of the obtained colored gel particles when dried as measured using a laser diffraction particle size distribution analyzer (HORIBA LA-300, trade name, manufactured by Horiba, Ltd.) is 6 μm. The colored gel particles are left to stand for 24 hours in ISOPAR M (trade name, manufactured by Exxon Mobile Corporation). The volume average particle size of the gel particles at an equilibrium and swollen state as measured using a laser diffraction particle size distribution analyzer (HORIBA LA-300, trade name, manufactured by Horiba, Ltd.) is 9.6 μm. The amount of liquid absorption of the gel particles at an equilibrium and swollen state as measured from the change in dry weight is 2 g/g.

(Evaluation)

A dispersion containing 2% by weight of the above gel particles in ISOPAR M (trade name, manufactured by Exxon Mobile Corporation) as a dispersing medium is prepared and the evaluation of electrophoretic properties is conducted.

The evaluation of electrophoretic properties is conducted by immersing a pair of electrode substrates (glass substrates with ITO, 2 mm in thickness, 1 cm in width and 5 cm in length) that are positioned via a gap of 1 mm in the dispersion and applying a direct voltage of 200V to the electrode substrates for 10 seconds, and then taking out the electrode substrates from the dispersion and evaluating the charge properties of the particles by observing the amount of particles attaching to the electrode substrates. As a result, particles of both positively charged and negatively charged exist on the electrode substrates, and the amount of positively charged particles is greater than that of the negatively charged particles. Therefore, it is found that the particles are not negatively charged as a result of introducing an acid group to the polymer gel. Accordingly, it is presumed that dissociation of acid and base is not achieved to a sufficient level.

Further, the $\xi$ potential of the gel particles is measured using a $\xi$ potential meter (MODEL 502 non-aqueous measurement unit, trade name, Nihon Rufuto Co., Ltd.). As a result, the electrophoretic speed is low and the $\xi$ potential is as low as +2 mV.

On the other hand, aggregation of the gel particles is not observed even with a microscope, showing the excellent dispersion stability of the gel particles. This is assumed to be a characteristic of a polymer gel that exhibits a sufficient amount of liquid absorption.

Comparative Example 2

The colored gel particles as prepared in Comparative Example 1 are dispersed in silicone oil (trade name: KF-96L, 2cs, manufactured by Shin-Etsu Chemical Co., Ltd.), and the particle size and the amount of liquid absorption are measured in accordance with the method as described in Comparative Example 1. As a result, the volume average particles size is 6 μm and the amount of liquid absorption is less than 0.1 g/g, showing that the gel particles are not swollen.

Further, the electrophoretic property of the gel particles in the silicone oil is measured in accordance with the method as described in Comparative Example 1. As a result, the electrophoretic movement of the gel particles is hardly observed, showing that the charging property of the gel particles is poor. Namely, it is found that dissociation of acid and base is not achieved to a sufficient level.

Moreover, the charging amount of $\xi$ potential of the gel particles is measured in accordance with the method as described in Comparative Example 1. As a result, the gel particles do not move electrophoretically and the $\xi$ potential thereof is zero.

Additionally, it is found that the gel particles tend to aggregate to form a coarse mass, showing their poor dispersion stability.

Comparative Example 3

First, an additive polymer having a hydrophilic group as a polar group is prepared in accordance with the following process.

5 parts by weight of toluene, 1.6 parts by weight of stearyl methacrylate, 0.4 parts by weight of 2-hydroxyethyl methacrylate (HEMA) and 0.02 parts by weight of azobisdimethylvaleronitrile as a polymerization initiator (V-65, trade name, manufactured by Wako Pure Chemical Industries, Ltd.) are mixed and thoroughly subjected to nitrogen replacement. Thereafter, the mixture is heated to 55° C. and allowed to polymerize for 5 hours. After the completion of polymerization, the obtained additive polymer is purified by removing the toluene by reducing the pressure and heating. The volume average molecular weight of the additive polymer as measured by a GPS measurement is 150,000.

A dispersion containing 2% by weight of the colored gel particles as prepared in Comparative Example 1 in ISOPAR M as a dispersing medium is prepared, and the additive polymer as prepared above is further added thereto in an amount of 2% by weight with respect to the total amount of the dispersion. Then, the electrophoretic property of the particles is evaluated in accordance with the method as described in Comparative Example 1. As a result, particles of both positively charged and negatively charged exist on the electrode substrates and the amount of positively charged particles is greater than that of the negatively charged particles. Therefore, it is found that the particles are not negatively charged as a result of adding the additive polymer having a hydrophilic group. Accordingly, it is presumed that dissociation of acid and base is not achieved to a sufficient level.

Further, the $\xi$ potential of the gel particles as measured in accordance with the method as described in Comparative Example 1 is as low as +3 mV.

Example 1

The colored gel particles as prepared in Comparative Example 1 (first polymer gel) is combined with a polymer compound having a hydrophilic group (second polymer compound) so as to form a semi-IPN structure in accordance with the following method.

1 part by weight of colored gel particles as prepared in Comparative Example 1, 5 parts by weight of toluene, 1.6 parts by weight of stearyl methacrylate, 0.4 parts by weight of 2-hydroxyethyl methacrylate (HEMA) and 0.02 parts by weight of azobisdimethylvaleronitrile as a polymerization initiator (V-65, trade name, manufactured by Wako Pure Chemical Industries, Ltd.) are mixed and thoroughly subjected to nitrogen replacement, and then heated to 55° C. and allowed to polymerize for 5 hours. After the completion of polymerization, the obtained particles are filtered and washed with toluene and THF. The amount of the second polymer compound in the obtained particles that is combined with the first polymer gel as determined by thermogravimetric analysis is 20% by weight with respect to the amount of first polymer gel.

The obtained colored gel particles having a semi-IPN structure are left to stand for 24 hours in ISOPAR M (trade name, manufactured by Exxon Mobile Corporation), and the volume average particle size at an equilibrium and swollen state as measured using a laser diffraction particle size distribution analyzer (HORIBA LA-300, trade name, manufactured by HORIBA, LTD.) is 10 μm. The amount of liquid absorption of the gel particles at an equilibrium and swollen state as measured from the change in dry weight is 2 g/g.

(Evaluation)

A dispersion containing the above colored gel particles having a semi-IPN structure in an amount of 2% by weight in ISOPAR M as a dispersing medium is prepared, and the electrophoretic property of the particles is evaluated in accordance with the method as described in Comparative Example 1. As a result, the obtained particles are negatively charged and exhibit a favorable electrophoretic property, showing that dissociation of acid and base is achieved to a sufficient level.

Further, the charging amount of the gel particles as measured in accordance with the method as described in Comparative Example 1 using a $\xi$ potential meter is as high as −40 mV.

Moreover, aggregation of the gel particles is not observed even with a microscope, showing the excellent dispersion stability of the gel particles. This is assumed to be a characteristic of a polymer gel having a sufficient amount of liquid absorption.

Example 2

A polymer compound having a hydrophilic group (second polymer compound) is combined with the colored gel particles as prepared in Comparative Example 1 (first polymer gel) so as to form a semi-IPN structure, in accordance with the following process.

1 part by weight of the colored gel particles as prepared in Comparative Example 1, 5 parts by weight of toluene, 1.0 part by weight of stearyl methacrylate, 1.0 part by weight of methoxypolyethylene glycol monomethacrylate (M90G) and 0.02 parts by weight of azobisdimethylvaleronitrile as a polymerization initiator (V-65, trade name, manufactured by Wako Pure Chemical Industries, Ltd.) are mixed and thoroughly subjected to nitrogen replacement, and then heated to 55° C. and allowed to polymerize for 5 hours. After the completion of polymerization, the obtained particles are filtered and washed with toluene and THF. The amount of the second polymer compound (hydrophilic polymer compound) in the obtained particles that is combined with the first polymer gel as determined by thermogravimetric analysis is 30% by weight with respect to the amount of first polymer gel.

The obtained colored gel particles having a semi-IPN structure are left to stand for 24 hours in ISOPAR M (trade name, manufactured by Exxon Mobile Corporation), and the volume average particle size at an equilibrium and swollen state as measured using a laser diffraction particle size distribution analyzer (HORIBA LA-300, trade name, manufactured by Horiba, Ltd.) is 10 µm. The amount of liquid absorption of the gel particles at an equilibrium and swollen state as measured from the change in dry weight is 2 g/g.

(Evaluation)

A dispersion containing the above colored gel particles having a semi-IPN structure in an amount of 2% by weight in ISOPAR M as a dispersing medium is prepared, and the electrophoretic property of the particles is evaluated in accordance with the method as described in Comparative Example 1. As a result, the obtained particles are negatively charged and exhibit a favorable electrophoretic property, showing that dissociation of acid and base is achieved to a sufficient level.

Further, the charging amount of the gel particles as measured in accordance with the method as described in Comparative Example 1 using a $\xi$ potential meter is as high as −30 mV.

Moreover, aggregation of the gel particles is not observed even with a microscope, showing the excellent dispersion stability of the gel particles. This is assumed to be a characteristic of a polymer gel having a sufficient amount of liquid absorption.

Comparative Example 4

Polymer gel particles having a magenta color and including a quaternary ammonium group are prepared in accordance with the following process, and are evaluated. The polymer gel particles include stearyl methacrylate as a main component.

(Pigment Dispersion)

3.0 parts by weight of a magenta pigment (EMACOL SF RED, trade name, manufactured by Sanyo Color Works, Ltd.), 27 parts by weight of ISOPAR M (trade name, manufactured by Exxon Mobile Corporation) and 1.5 parts by weight of SOLSPERSE 17000 (trade name, manufactured by Lubrizol Advanced Materials Inc.) are mixed and stirred for 10 minutes using a supersonic pulverizer (UH-600S, trade name, manufactured by SMT Co., Ltd.) to disperse the pigment.

Subsequently, as a dispersing medium, a solution is prepared by mixing 2 parts by weight of polyvinyl pyrrolidone (molecular weight: 90K, manufactured by Wako Pure Chemical Industries, Ltd.) and 0.5 parts by weight of sodium dodecyl sulfate in 100 parts by weight of distilled water.

(Gel Particles)

5 parts by weight of the above pigment dispersion, 4 parts by weight of stearyl methacrylate, 1 part by weight of diethylaminoethyl methacrylate, 0.1 part by weight of ethylene glycol dimethacrylate and 0.05 parts by weight of azobisdimethylvaleronitrile as an initiator (V-65, trade name, manufactured by Wako Pure Chemical Industries, Ltd.) are mixed, and this is further mixed in the above dispersing medium and stirred using a homogenizer to disperse the monomer droplets in a continuous phase of the aqueous solution. The solution is placed in a flask and the content thereof is thoroughly subjected to nitrogen replacement, and is then allowed to polymerize while stirring with a rotor at 55° C. for 5 hours. Further, 1 part by weight of ethyl iodide is added to the mixture and heated to 80° C. for 2 hours in order to quaternarize the amino group (converting to triethyl ammonium).

After the completion of reaction, particles are recovered by filtering and washed with tetrahydrofuran (THF) and toluene. The volume average particles size of the obtained colored gel particles when dried as measured using a laser diffraction particle size distribution analyzer (HORIBA LA-300, trade name, manufactured by Horiba, Ltd.) is 6 µm. The colored gel particles are left to stand for 24 hours in ISOPAR M (trade name, manufactured by Exxon Mobile Corporation). The volume average particle size of the gel particles at an equilibrium and swollen state as measured using a laser diffraction particle size distribution analyzer (HORIBA LA-300, trade name, manufactured by Horiba, Ltd.) is 9.6 µm. The amount of liquid absorption of the gel particles at an equilibrium and swollen state as measured from the change in dry weight is 2 g/g.

(Evaluation)

A dispersion containing 2% by weight of the above gel particles in ISOPAR M (trade name, manufactured by Exxon Mobile Corporation) as a dispersing medium is prepared and the evaluation of electrophoretic properties is conducted.

As a result, particles of both positively charged and negatively charged exist on the electrode substrates, even though the amount of positively charged particles is greater than that of negatively charged particles. Therefore, it is found that the particles are not completely positively charged even with the introduction of a quaternary ammonium group to the polymer gel. Accordingly, it is presumed that dissociation of acid and base is not achieved to a sufficient level.

Further, the $\xi$ potential of the gel particles is measured using a $\xi$ potential meter (MODEL 502 non-aqueous measurement unit, trade name, Nihon Rufuto Co., Ltd.). As a result, the eletrophoretic speed is low and the $\xi$ potential is as low as +4 mV.

On the other hand, aggregation of the gel particles is not observed even with a microscope, showing the excellent dispersion stability of the gel particles. This is assumed to be a characteristic of a polymer gel that exhibits a sufficient amount of liquid absorption.

Comparative Example 5

The colored gel particles as prepared in Comparative Example 4 are dispersed in silicone oil (trade name: KF-96L, 2cs, manufactured by Shin-Etsu Chemical Co., Ltd.), and the particle size and the amount of liquid absorption are measured in accordance with the method as described in Comparative Example 1. As a result, the volume average particles size is 6 μm and the amount of liquid absorption is less than 0.1 g/g, showing that the gel particles are not swollen.

Further, the electrophoretic property of the gel particles in the silicone oil is measured in accordance with the method as described in Comparative Example 1. As a result, the electrophoretic movement of the gel particles is not good and the charging property is at a low level, although the gel particles are slightly positively charged. This result shows that dissociation of acid and base is not achieved to a sufficient level.

Moreover, the charging amount ($\xi$ potential) of the gel particles as measured in accordance with the method as described in Comparative Example 1 is as low as +2 mV.

Additionally, it is found that the gel particles tend to aggregate to form a coarse mass, showing that a sufficient level of dispersion stability is not achieved.

Example 3

A polymer compound having a hydrophilic group (second polymer compound) is combined with the colored gel particles as prepared in Comparative Example 4 (first polymer gel) to form a semi-IPN structure, in accordance with the following process.

1 part by weight of colored gel particles as prepared in Comparative Example 4, 5 parts by weight of toluene, 1.6 parts by weight of stearyl methacrylate, 0.4 parts by weight of 2-hydroxyethyl methacrylate (HEMA) and 0.02 parts by weight of azobisdimethylvaleronitrile as a polymerization initiator (V-65, trade name, manufactured by Wako Pure Chemical Industries, Ltd.) are mixed and thoroughly subjected to nitrogen replacement. Thereafter, the mixture is heated to 55° C. and allowed to polymerize for 5 hours. After the completion of polymerization, the obtained particles are filtered and washed with toluene and THF. The amount of the second polymer compound in the obtained particles that is combined with the first polymer gel as determined by thermogravimetric analysis is 30% by weight with respect to the amount of first polymer gel.

The obtained colored gel particles having a semi-IPN structure are left to stand for 24 hours in ISOPAR M (trade name, manufactured by Exxon Mobile Corporation), and the volume average particle size at an equilibrium and swollen state as measured using a laser diffraction particle size distribution analyzer (HORIBA LA-300, trade name, manufactured by Horiba, Ltd.) is 10 μm. The amount of liquid absorption of the gel particles at an equilibrium and swollen state as measured from the change in dry weight is 2 g/g.

(Evaluation)

A dispersion containing the above colored gel particles having a semi-IPN structure in an amount of 2% by weight in ISOPAR M as a dispersing medium is prepared, and the electrophoretic property of the particles is evaluated in accordance with the method as described in Comparative Example 1. As a result, the obtained particles are positively charged and exhibit a favorable electrophoretic property, showing that dissociation of acid and base is achieved to a sufficient level.

Further, the charging amount ($\xi$ potential) of the gel particles as measured in accordance with the method as described in Comparative Example 1 using a $\xi$ potential meter is as high as +80 mV.

Moreover, aggregation of the gel particles is not observed even with a microscope, showing the excellent dispersion stability of the gel particles. This is assumed to be a characteristic of a polymer gel having a sufficient amount of liquid absorption.

Example 4

A polymer compound having a hydrophilic group (second polymer compound) is combined with the colored gel particles as prepared in Comparative Example 4 (first polymer gel) to form a semi-IPN structure, in accordance with the following process.

1 part by weight of the colored gel particles as prepared in Comparative Example 4, 5 parts by weight of toluene, 1.0 part by weight of stearyl methacrylate, 1.0 part by weight of methoxypolyethylene glycol monomethacrylate (M90G) and 0.02 parts by weight of azobisdimethylvaleronitrile as a polymerization initiator (V-65, trade name, manufactured by Wako Pure Chemical Industries, Ltd.) are mixed and thoroughly subjected to nitrogen replacement, and then heated to 55° C. and allowed to polymerize for 5 hours. After the completion of polymerization, the obtained particles are filtered and washed with toluene and THF. The amount of the second polymer compound (hydrophilic polymer compound) in the obtained particles that is combined with the first polymer gel as determined by thermogravimetric analysis is 30% by weight with respect to the amount of first polymer gel.

The obtained colored gel particles having a semi-IPN structure are left to stand for 24 hours in ISOPAR M (trade name, manufactured by Exxon Mobile Corporation), and the volume average particle size at an equilibrium and swollen state as measured using a laser diffraction particle size distribution analyzer (HORIBA LA-300, trade name, manufactured by Horiba, Ltd.) is 10 μm. The amount of liquid absorption of the gel particles at an equilibrium and swollen state as measured from the change in dry weight is 2 g/g.

(Evaluation)

A dispersion containing the above colored gel particles having a semi-IPN structure in an amount of 2% by weight in ISOPAR M as a dispersing medium is prepared, and the electrophoretic property of the particles is evaluated in accordance with the method as described in Comparative Example 1. As a result, the obtained particles are positively charged and exhibit a favorable level of electrophoretic property, showing that dissociation of acid and base is achieved to a sufficient level.

Further, the charging amount ($\xi$ potential) of the gel particles as measured in accordance with the method as described in Comparative Example 1 using a $\xi$ potential meter is as high as +60 mV.

Moreover, aggregation of the gel particles is not observed even with a microscope, showing the excellent dispersion stability of the gel particles. This is assumed to be a characteristic of a polymer gel having a sufficient amount of liquid absorption.

Example 5

A polymer compound having a hydrophilic group (a crosslinked product of the second polymer compound: gel) is combined with the colored gel particles as prepared in Comparative Example 4 (first polymer gel) so as to form an IPN structure, in accordance with the following process.

1 part by weight of the colored gel particles as prepared in Comparative Example 4, 5 parts by weight of toluene, 1.6 parts by weight of stearyl methacrylate, 0.4 parts by weight of 2-hydroxyethyl methacrylate (HEMA) and 0.02 parts by weight of azobisdimethylvaleronitrile as a polymerization initiator (V-65, trade name, manufactured by Wako Pure Chemical Industries, Ltd.) are mixed and thoroughly subjected to nitrogen replacement, and then heated to 55° C. and allowed to polymerize for 5 hours. After the completion of polymerization, the viscosity of the whole solution is increased to form a gel of the second polymerization compound. The obtained particles are stirred and subjected to solvent substitution with a large amount of toluene and THF for several times, and an excess amount of the gel of second polymer compound is removed and washed. The amount of the second polymer compound in the obtained particles that is combined with the first polymer gel as determined by thermogravimetric analysis is 35% by weight with respect to the amount of the first polymer gel.

The obtained colored gel particles having an IPN structure are left to stand for 24 hours in ISOPAR M (trade name, manufactured by Exxon Mobile Corporation), and the volume average particle size at an equilibrium and swollen state as measured using a laser diffraction particle size distribution analyzer (HORIBA LA-300, trade name, manufactured by Horiba, Ltd.) is 10 μm. The amount of liquid absorption of the gel particles at an equilibrium and swollen state as measured from the change in dry weight is 2 g/g.

(Evaluation)

A dispersion containing the above colored gel particles having an IPN structure in an amount of 2% by weight in ISOPAR M as a dispersing medium is prepared, and the electrophoretic property of the particles is evaluated in accordance with the method as described in Comparative Example 1. As a result, the obtained particles are positively charged and exhibit a favorable level of electrophoretic property, showing that dissociation of acid and base is achieved to a sufficient level.

Further, the charging amount (ξ potential) of the gel particles as measured in accordance with the method as described in Comparative Example 1 using a ξ potential meter is as high as +80 mV.

Moreover, aggregation of the gel particles is not observed even with a microscope, showing the excellent dispersion stability of the gel particles. This is assumed to be a characteristic of a polymer gel having a sufficient amount of liquid absorption.

Example 6

Gel particles having a structure in which the first polymer gel and the second polymer compound that form a semi-IPN structure based on Example 3 are covalently bonded to each other are prepared. Namely, magenta polymer gel particles including stearyl methacrylate as a main component and having an amino group and an isocyanate group (as a reactive group with respect to the second polymer compound) are prepared in accordance with the following method, and then evaluated.

(Gel Particles)

5 parts by weight of the pigment dispersion as prepared in Comparative Example 4, 4 parts by weight of stearyl methacrylate, 1 part by weight of diethylaminoethyl methacrylate, 0.2 parts by weight of an isocyanate group-containing monomer (KARENZ MOI, trade name, manufactured by Showa Denko K.K.), 0.1 part by weight of ethylene glycol dimethacrylate and 0.05 parts by weight of azobisdimethylvaleronitrile as an initiator (V-65, trade name, manufactured by Wako Pure Chemical Industries, Ltd.) are mixed, and this is further mixed in the dispersing medium as prepared in Comparative Example 4 and stirred using a homogenizer to disperse the monomer droplets in a continuous phase of the aqueous solution. The solution is placed in a flask and the content thereof is thoroughly subjected to nitrogen replacement, and is then allowed to polymerize while stirring with a rotor at 55° C. for 5 hours. Further, 1 part by weight of ethyl iodide is added to the mixture and heated to 80° C. for 2 hours in order to quaternarize the amino group (converting to triethyl ammonium).

After the completion of reaction, particles are recovered by filtering and washed with tetrahydrofuran (THF) and toluene. The volume average particles size of the obtained colored gel particles when dried as measured using a laser diffraction particle size distribution analyzer (HORIBA LA-300, trade name, manufactured by Horiba, Ltd.) is 6.0 μm. The colored gel particles are left to stand for 24 hours in ISOPAR M (trade name, manufactured by Exxon Mobile Corporation). The volume average particle size of the gel particles at an equilibrium and swollen state as measured using a laser diffraction particle size distribution analyzer (HORIBA LA-300, trade name, manufactured by Horiba, Ltd.) is 9.6 μm. The amount of liquid absorption of the gel particles at an equilibrium and swollen state as measured from the change in dry weight is 2 g/g.

Further, the result of IR spectroscopy shows that the gel particles have an isocyanate group.

Then, a polymer compound having a hydrophilic group (second polymer compound) is combined with the thus obtained colored gel particles (first polymer gel) so as to form a semi-IPN structure, in accordance with the method as described in Example 3.

1 part by weight of colored gel particles as prepared above, 5 parts by weight of toluene, 1.6 parts by weight of stearyl methacrylate, 0.4 parts by weight of 2-hydroxyethyl methacrylate (HEMA) and 0.02 parts by weight of azobisdimethylvaleronitrile as a polymerization initiator (V-65, trade name, manufactured by Wako Pure Chemical Industries, Ltd.) are mixed and thoroughly subjected to nitrogen replacement. Thereafter, the mixture is allowed to polymerize by heating to 55° C. for 5 hours. After the completion of polymerization, the obtained particles are filtered and washed with toluene and THF. The amount of the second polymer compound in the obtained particles that is combined with the first polymer gel as determined by thermogravimetric analysis is 25% by weight with respect to the amount of first polymer gel.

Further, it is determined by IR spectrography that the isocyanate groups disappear, showing that the first polymer gel is covalently bonded to the second polymer compound by reacting with HEMA having a hydroxyl group.

The obtained colored gel particles having a semi-IPN structure are left to stand for 24 hours in ISOPAR M (trade name, manufactured by Exxon Mobile Corporation), and the volume average particle size at an equilibrium and swollen state as measured using a laser diffraction particle size distribution analyzer (HORIBA LA-300, trade name, manufactured by Horiba, Ltd.) is 11 μm. The amount of liquid absorption of the gel particles at an equilibrium and swollen state as measured from the change in dry weight is 2.5 g/g.

Further, in order to determine whether or not the second polymer compound that forms a semi-IPN structure is combined in a stable manner by covalent bonding, a comparative evaluation with respect to Example 3 is conducted. The evaluation is conducted by preparing a solution in which a predetermined amount of semi-IPN colored gel particles are dispersed in ISOPAR M, heating this dispersion and maintaining at 100° C. for 48 hours, separating the supernatant liquid by centrifugation, and then determining the amount of the free polymer compound included in the supernatant liquid by mass measurement.

As a result, while the isolation of 1% by weight of the second polymer compound in the dried semi-IPN colored gel particles as prepared in Example 3 is detected, no isolation of the second polymer compound is detected in the semi-IPN colored gel particles as prepared in Example 6. It is thus presumed that the semi-IPN colored gel particles as prepared in Example 6 achieve more stable combination due to the reaction of the second polymer compound with the isocyanate group.

(Evaluation)

A dispersion containing 2% by weight of the above semi-IPN colored gel particles in ISOPAR M (trade name, manufactured by Exxon Mobile Corporation) as a dispersing medium is prepared, and the electrophoretic property of the particles is evaluated.

As a result, the obtained particles are positively charged and exhibit a favorable electrophoretic property. Accordingly, it is found that dissociation of acid and base is achieved to a sufficient level.

Further, the charging amount ($\xi$ potential) of the gel particles is measured using a $\xi$ potential meter in accordance with the method as described in Comparative Example 1. As a result, the $\xi$ potential is as high as +85 mV.

The aggregation of the gel particles is not observed even with a microscope, showing the excellent dispersion stability of the gel particles. This is assumed to be a characteristic of a polymer gel that exhibits a sufficient amount of liquid absorption.

Comparative Example 6

Polymer gel particles having a magenta color that include a silicone monomer as a main component and have an acid group are prepared in accordance with the following method, and are evaluated.

(Pigment Dispersion)

A copolymer of a silicone monomer (SILAPLANE FM-0711, trade name, manufactured by Chisso Corporation) and dimethylaminoethyl methacrylate at a mass ratio of 95/5 (weight average molecular weight: 200,000) is prepared and used as a pigment dispersant.

3.0 parts by weight of a magenta pigment (EMACOL SF RED, trade name, manufactured by Sanyo Color Works, Ltd.), 7 parts by weight of a silicone oil (trade name: KF-96L, 2cs, manufactured by Shin-Etsu Chemical Co., Ltd.) and 1 part by weight of the above copolymer as a dispersant are mixed and stirred using a supersonic pulverizer (UH-600S, trade name, manufactured by SMT Co., Ltd.) to disperse the pigment.

Subsequently, a solution is prepared as a dispersing medium by mixing 2 parts by weight of polyvinyl pyrrolidone (molecular weight: 90K, manufactured by Wako Pure Chemical Industries, Ltd.) and 0.5 parts by weight of sodium dodecyl sulfate in 100 parts by weight of distilled water.

(Gel Particles)

5 parts by weight of the above pigment dispersion, 4 parts by weight of difunctional silicone monomer (X22-164 AS, trade name, manufactured by Shin-Etsu Chemical Co., Ltd.), 1 part by weight of a trihexylamine salt of methacrylic acid and 0.05 parts by weight of azobisdimethylvaleronitrile as an initiator (V-65, trade name, manufactured by Wako Pure Chemical Industries, Ltd.) are mixed, and this is further mixed in the above dispersing medium and stirred using a homogenizer to disperse the monomer droplets in a continuous phase of the aqueous solution. The solution is placed in a flask and the content thereof is thoroughly subjected to nitrogen replacement, and is then allowed to polymerize while stirring with a rotor at 55° C. for 5 hours.

After the completion of polymerization, particles are recovered by filtering and washed with tetrahydrofuran (THF) and toluene. The volume average particles size of the obtained colored gel particles when dried as measured using a laser diffraction particle size distribution analyzer (HORIBA LA-300, trade name, manufactured by Horiba, Ltd.) is 6 μm. The colored gel particles are left to stand for 24 hours in silicone oil (trade name: KF-96L, 2cs, manufactured by Shin-Etsu Chemical Co., Ltd.). The volume average particle size of the gel particles at an equilibrium and swollen state as measured using a laser diffraction particle size distribution analyzer (HORIBA LA-300, trade name, manufactured by Horiba, Ltd.) is 9.5 μm. The amount of liquid absorption of the gel particles at an equilibrium and swollen state as measured from the change in dry weight is 2 g/g.

(Evaluation)

A dispersion containing 2% by weight of the above gel particles in silicone oil (trade name: KF-96L, 2cs, manufactured by Shin-Etsu Chemical Co., Ltd.) as a dispersing medium is prepared and the evaluation of electrophoretic properties is conducted.

As a result, most particles are positively charged and it is found that the charge polarity is not controlled.

Further, the $\xi$ potential of only the negatively charged particles is measured using a $\xi$ potential meter (MODEL 502 non-aqueous measurement unit, trade name, Nihon Rufuto Co., Ltd.). As a result, the eletrophoretic speed is low and the $\xi$ potential is as low as −5 mV.

On the other hand, aggregation of the gel particles is not observed even with a microscope, showing the excellent dispersion stability of the gel particles. This is assumed to be a characteristic of a polymer gel that exhibits a sufficient amount of liquid absorption.

Example 7

A polymer compound having a hydrophilic group (second polymer compound) is combined with the silicone-based colored gel particles as prepared in Comparative Example 6 (first polymer gel) so as to form a semi-IPN structure, in accordance with the following method.

1 part by weight of colored gel particles as prepared in Comparative Example 6, 3 parts by weight of a silicone oil (trade name: KF-96L, 2cs, manufactured by Shin-Etsu Chemical Co., Ltd.), 3 parts by weight of tetrahydrofuran (THF), 1.6 parts by weight of a silicone-based monomer (SILAPLANE FM-0711, trade name, manufactured by Chisso Corporation), 0.4 parts by weight of 2-hydroxyethyl methacrylate (HEMA) and 0.02 parts by weight of azobis-dimethylvaleronitrile as a polymerization initiator (V-65, trade name, manufactured by Wako Pure Chemical Industries, Ltd.) are mixed and thoroughly subjected to nitrogen replacement. Thereafter, the mixture is heated to 55° C. and allowed to polymerize for 5 hours.

After the completion of polymerization, the obtained particles are filtered and washed with toluene and THF. The amount of the second polymer compound in the obtained particles that is combined with the first polymer gel as determined by thermogravimetric analysis is 20% by weight with respect to the amount of first polymer gel.

The obtained colored gel particles having a semi-IPN structure are left to stand for 24 hours in silicone oil (trade name: KF-96L, 2cs, manufactured by Shin-Etsu Chemical Co., Ltd.), and the volume average particle size at an equilibrium and swollen state as measured using a laser diffraction particle size distribution analyzer (HORIBA LA-300, trade name, manufactured by Horiba, Ltd.) is 10 μm. The amount of liquid absorption of the gel particles at an equilibrium and swollen state as measured from the change in dry weight is 2 g/g.

(Evaluation)

A dispersion containing 2% by weight of the above semi-IPN colored gel particles in silicone oil (trade name: KF-96L, 2cs, manufactured by Shin-Etsu Chemical Co., Ltd.) as a dispersing medium is prepared and the evaluation of electrophoretic properties is conducted in accordance with the method as described in Comparative Example 1.

As a result, the obtained particles are negatively charged and exhibit a favorable electrophoretic property. Accordingly, it is found that dissociation of acid and base is achieved to a sufficient level.

Further, the charge amount (ξ potential) of the gel particles is measured using a ξ potential meter in accordance with the method as described in Comparative Example 1. As a result, the ξ potential is as high as −30 mV.

On the other hand, aggregation of the gel particles is not observed even with a microscope, showing the excellent dispersion stability of the gel particles. This is assumed to be a characteristic of a polymer gel that exhibits a sufficient amount of liquid absorption.

Example 8

A polymer compound having a hydrophilic group (second polymer compound) is combined with the silicone-based colored gel particles as prepared in Comparative Example 6 (first polymer gel) so as to form a semi-IPN structure, in accordance with the following method.

1 part by weight of colored gel particles as prepared in Comparative Example 6, 3 parts by weight of a silicone oil (trade name: KF-96L, 2cs, manufactured by Shin-Etsu Chemical Co., Ltd.), 3 parts by weight of tetrahydrofuran (THF), 1 part by weight of a silicone-based monomer (SILAPLANE FM-0711, trade name, manufactured by Chisso Corporation), 1.0 part by weight of methoxy polyethylene glycol momomethacrylate (M90G) and 0.02 parts by weight of azobisdimethylvaleronitrile as a polymerization initiator (V-65, trade name, manufactured by Wako Pure Chemical Industries, Ltd.) are mixed and thoroughly subjected to nitrogen replacement. Thereafter, the mixture is heated to 55° C. and allowed to polymerize for 5 hours.

After the completion of polymerization, the obtained particles are filtered and washed with THF. The amount of the second polymer compound in the obtained particles that is combined with the first polymer gel as determined by thermogravimetric analysis is 25% by weight with respect to the amount of first polymer gel.

The obtained colored gel particles having a semi-IPN structure are left to stand for 24 hours in silicone oil (trade name: KF-96L, 2cs, manufactured by Shin-Etsu Chemical Co., Ltd.), and the volume average particle size at an equilibrium and swollen state as measured using a laser diffraction particle size distribution analyzer (HORIBA LA-300, trade name, manufactured by Horiba, Ltd.) is 10.2 μm. The amount of liquid absorption of the gel particles at an equilibrium and swollen state as measured from the change in dry weight is 2 g/g.

(Evaluation)

A dispersion containing 2% by weight of the above semi-IPN colored gel particles in silicone oil (trade name: KF-96L, 2cs, manufactured by Shin-Etsu Chemical Co., Ltd.) as a dispersing medium is prepared and the evaluation of electrophoretic properties is conducted in accordance with the method as described in Comparative Example 1.

As a result, the obtained particles are negatively charged and exhibit a favorable electrophoretic property. Accordingly, it is found that dissociation of acid and base is achieved to a sufficient level.

Further, the charge amount (ξ potential) of the gel particles is measured using a ξ potential meter in accordance with the method as described in Comparative Example 1. As a result, the ξ potential is as high as −35 mV.

On the other hand, aggregation of the gel particles is not observed even with a microscope, showing the excellent dispersion stability of the gel particles. This is assumed to be a characteristic of a polymer gel that exhibits a sufficient amount of liquid absorption.

Example 9

A polymer compound having a hydrophilic group (a crosslinked product of second polymer compound: gel) is combined with the silicone-based colored gel particles as prepared in Comparative Example 6 (first polymer gel) so as to form an IPN structure, in accordance with the following method.

1 part by weight of colored gel particles as prepared in Comparative Example 6, 3 parts by weight of a silicone oil (trade name: KF-96L, 2cs, manufactured by Shin-Etsu Chemical Co., Ltd.), 3 parts by weight of tetrahydrofuran (THF), 1 part by weight of a silicone-based monomer (SILAPLANE FM-0711, trade name, manufactured by Chisso Corporation), 1.0 part by weight of methoxy polyethylene glycol momomethacrylate (M90G), 0.02 parts by weight of ethylene glycol dimethacrylate and 0.02 parts by weight of azobisdimethylvaleronitrile as a polymerization initiator (V-65, trade name, manufactured by Wako Pure Chemical Industries, Ltd.) are mixed and thoroughly subjected to nitrogen replacement. Thereafter, the mixture is allowed to polymerize while stirring for 5 hours. After the completion of polymerization, the viscosity of the solution is increased, and a gel of the second polymer compound is formed. The obtained particles are subjected to stirring and solution substitution with a large amount of THF for several times to remove an excess amount of the second polymer compound gel, and are then washed. The amount of the second polymer compound in the obtained particles that is combined with the first polymer gel as determined by thermogravimetric analysis is 30% by weight with respect to the amount of first polymer gel.

The obtained colored gel particles having an IPN structure are left to stand for 24 hours in silicone oil (trade name: KF-96L, 2cs, manufactured by Shin-Etsu Chemical Co., Ltd.), and the volume average particle size at an equilibrium and swollen state as measured using a laser diffraction particle size distribution analyzer (HORIBA LA-300, trade name, manufactured by Horiba, Ltd.) is 10.2 μm. The amount of liquid absorption of the gel particles at an equilibrium and swollen state as measured from the change in dry weight is 2 g/g.

(Evaluation)

A dispersion containing 2% by weight of the above IPN colored gel particles in silicone oil (trade name: KF-96L, 2cs, manufactured by Shin-Etsu Chemical Co., Ltd.) as a dispersing medium is prepared, and the evaluation of electrophoretic properties is conducted in accordance with the method as described in Comparative Example 1.

As a result, the obtained particles are negatively charged and exhibit a favorable electrophoretic property. Accordingly, it is found that dissociation of acid and base is achieved to a sufficient level.

Further, the charge amount ($\xi$ potential) of the gel particles is measured using a $\xi$ potential meter in accordance with the method as described in Comparative Example 1. As a result, the $\xi$ potential is as high as −40 mV.

On the other hand, aggregation of the gel particles is not observed even with a microscope, showing the excellent dispersion stability of the gel particles. This is assumed to be a characteristic of a polymer gel that exhibits a sufficient amount of liquid absorption.

Comparative Example 7

Polymer gel particles having a blue color that include a silicone monomer as a main component and have an amino group are prepared in accordance with the following method, and are evaluated.

(Pigment Dispersion)

A copolymer of a silicone monomer (SILAPLANE FM-0711, trade name, manufactured by Chisso Corporation) and dimethylaminoethyl methacrylate at a weight ratio of 95/5 (weight average molecular weight: 200,000) is prepared and used as a pigment dispersant.

3.0 parts by weight of a blue pigment (CYANINE BLUE 3020, trade name, manufactured by Sanyo Color Works, Ltd.), 7 parts by weight of a silicone oil (trade name: KF-96L, 2cs, manufactured by Shin-Etsu Chemical Co., Ltd.) and 1 part by weight of the above copolymer as a dispersant are mixed and stirred using a supersonic pulverizer (UH-600S, trade name, manufactured by SMT Co., Ltd.) to disperse the pigment.

Subsequently, as a dispersing medium, a solution is prepared by mixing 2 parts by weight of polyvinyl pyrrolidone (molecular weight: 90K, manufactured by Wako Pure Chemical Industries, Ltd.) and 0.5 parts by weight of sodium dodecyl sulfate in 100 parts by weight of distilled water.

(Gel Particles)

5 parts by weight of the above pigment dispersion, 4 parts by weight of a silicone monomer (SILAPLANE FM-0711, trade name, manufactured by Chisso Corporation), 1 part by weight of diethylaminoethyl methacrylate, 0.1 part by weight of ethylene glycol dimethacrylate, and 0.05 parts by weight of azobisdimethylvaleronitrile as an initiator (V-65, trade name, manufactured by Wako Pure Chemical Industries, Ltd.) are mixed, and this is further mixed in the above dispersing medium and stirred using a homogenizer to disperse the monomer droplets in a continuous phase of the aqueous solution. The solution is placed in a flask and the content thereof is thoroughly subjected to nitrogen replacement, and is then allowed to polymerize while stirring with a rotor at 55° C. for 5 hours. Further, 1 part by weight of ethyl iodide is added to the mixture and heated to 80° C. for 2 hours in order to quaternarize the amino group (converting to triethyl ammonium).

After the completion of reaction, particles are recovered by filtering and washed with tetrahydrofuran (THF). The volume average particles size of the obtained colored gel particles when dried as measured using a laser diffraction particle size distribution analyzer (HORIBA LA-300, trade name, manufactured by Horiba, Ltd.) is 6 μm. The colored gel particles are left to stand for 24 hours in silicone oil (trade name: KF-96L, 2cs, manufactured by Shin-Etsu Chemical Co., Ltd.). The volume average particle size of the gel particles at an equilibrium and swollen state as measured using a laser diffraction particle size distribution analyzer (HORIBA LA-300, trade name, manufactured by Horiba, Ltd.) is 9.5 μm. The amount of liquid absorption of the gel particles at an equilibrium and swollen state as measured from the change in dry weight is 2 g/g.

(Evaluation)

A dispersion containing 2% by weight of the above gel particles in silicone oil (trade name: KF-96L, 2cs, manufactured by Shin-Etsu Chemical Co., Ltd.) as a dispersing medium is prepared, and the evaluation of electrophoretic properties is conducted in accordance with the method as described in Comparative Example 1.

As a result, the particles are slightly positively charged, but the electrophoretic property is poor and the charging property is low. Therefore, it is determined that dissociation of acid and base is not achieved to a sufficient level.

Further, the charge amount ($\xi$ potential) of the particles is measured using a $\xi$ potential meter, in accordance with the method as described in Comparative Example 1. As a result, the $\xi$ potential is as low as +3 mV.

Moreover, the gel particles tend to aggregate to form a coarse mass, showing the poor dispersion stability of the gel particles.

Example 10

A polymer compound having a hydrophilic group (second polymer compound) is combined with the silicone-based colored gel particles as prepared in Comparative Example 7 (first polymer gel) so as to form a semi-IPN structure, in accordance with the following method.

1 part by weight of colored gel particles as prepared in Comparative Example 7, 3 parts by weight of a silicone oil (trade name: KF-96L, 2cs, manufactured by Shin-Etsu Chemical Co., Ltd.), 3 parts by weight of tetrahydrofuran (THF), 1.5 parts by weight of a silicone-based monomer (SILAPLANE FM-0711, trade name, manufactured by Chisso Corporation), 0.5 parts by weight of 2-hydroxyethyl methacrylate (HEMA) and 0.02 parts by weight of azobis-dimethylvaleronitrile as a polymerization initiator (V-65, trade name, manufactured by Wako Pure Chemical Industries, Ltd.) are mixed and thoroughly subjected to nitrogen replacement. Thereafter, the mixture is allowed to polymerize by heating to 55° C. for 5 hours. After the completion of polymerization, the obtained particles are filtered and washed with THF. The amount of the second polymer compound in the obtained particles that is combined with the first polymer gel as determined by thermogravimetric analysis is 25% by weight with respect to the amount of first polymer gel.

The obtained colored gel particles having a semi-IPN structure are left to stand for 24 hours in silicone oil (trade name: KF-96L, 2cs, manufactured by Shin-Etsu Chemical Co., Ltd.), and the volume average particle size at an equilibrium and swollen state as measured using a laser diffraction particle size distribution analyzer (HORIBA LA-300, trade name, manufactured by Horiba, Ltd.) is 11 μm. The amount of liquid absorption of the gel particles at an equilibrium and swollen state as measured from the change in dry weight is 3 g/g.

(Evaluation)

A dispersion containing 2% by weight of the above semi-IPN colored gel particles in silicone oil (trade name: KF-96L, 2cs, manufactured by Shin-Etsu Chemical Co., Ltd.) as a dispersing medium is prepared and the evaluation of electrophoretic properties is conducted in accordance with the method as described in Comparative Example 1.

As a result, the obtained particles are positively charged and exhibit a favorable electrophoretic property. Accordingly, it is found that dissociation of acid and base is achieved to a sufficient level.

Further, the charge amount (ξ potential) of the gel particles is measured using a ξ potential meter in accordance with the method as described in Comparative Example 1. As a result, the ξ potential is as high as +90 mV.

On the other hand, aggregation of the gel particles is not observed even with a microscope, showing the excellent dispersion stability of the gel particles. This is assumed to be a characteristic of a polymer gel that exhibits a sufficient amount of liquid absorption.

Example 11

Gel particles having a structure in which the first polymer gel and the second polymer compound that form a semi-IPN structure based on Example 10 are covalently bonded to each other are prepared. Namely, blue polymer gel particles including a silicone monomer as a main component, and having an amino group and an isocyanate group as a reactive group with respect to the second polymer compound are prepared in accordance with the following method, and evaluated.

(Gel Particles)

A copolymer of a silicone monomer (SILAPLANE FM-0711, trade name, manufactured by Chisso Corporation) and dimethylaminoethyl methacrylate at a weight ratio of 95/5 (weight average molecular weight: 200,000) is prepared and used as a pigment dispersant.

3.0 parts by weight of a blue pigment (CYANINE BLUE 3020, trade name, manufactured by Sanyo Color Works, Ltd.), 7 parts by weight of a silicone oil (trade name: KF-96L, 2cs, manufactured by Shin-Etsu Chemical Co., Ltd.) and 1 part by weight of the above copolymer as a dispersant are mixed and stirred using a supersonic pulverizer (UH-600S, trade name, manufactured by SMT Co., Ltd.) to disperse the pigment.

Subsequently, as a dispersing medium, a solution is prepared by mixing 2 parts by weight of polyvinyl pyrrolidone (molecular weight: 90K, manufactured by Wako Pure Chemical Industries, Ltd.) and 0.5 parts by weight of sodium dodecyl sulfate in 100 parts by weight of distilled water.

(Gel Particles)

5 parts by weight of the pigment dispersion as prepared above, 4 parts by weight of a silicone monomer (SILAPLANE FM-0711, trade name, manufactured by Chisso Corporation), 1 part by weight of diethylaminoethyl methacrylate, 0.2 parts by weight of an isocyanate group-containing monomer (KARENZ MOI, trade name, manufactured by Showa Denko K.K.), 0.1 part by weight of ethylene glycol dimethacrylate and 0.05 parts by weight of azobisdimethylvaleronitrile as an initiator (V-65, trade name, manufactured by Wako Pure Chemical Industries, Ltd.) are mixed, and this is further mixed in the dispersing medium as prepared above and stirred using a homogenizer to disperse the monomer droplets in a continuous phase of the aqueous solution. This solution is placed in a flask and the content thereof is thoroughly subjected to nitrogen replacement, and is then allowed to polymerize while stirring with a rotor at 55° C. for 5 hours. Further, 1 part by weight of ethyl iodide is added to the mixture and heated to 80° C. for 2 hours in order to quaternarize the amino group (converting to triethyl ammonium).

After the completion of reaction, particles are recovered by filtering and washed with tetrahydrofuran (THF). The volume average particles size of the obtained colored gel particles when dried as measured using a laser diffraction particle size distribution analyzer (HORIBA LA-300, trade name, manufactured by Horiba, Ltd.) is 6 µm. The colored gel particles are left to stand for 24 hours in silicone oil (trade name: KF-96L, 2cs, manufactured by Shin-Etsu Chemical Co., Ltd.) The volume average particle size of the gel particles at an equilibrium and swollen state as measured using a laser diffraction particle size distribution analyzer (HORIBA LA-300, trade name, manufactured by Horiba, Ltd.) is 9.5 µm. The amount of liquid absorption of the gel particles at an equilibrium and swollen state as measured from the change in dry weight is 2 g/g.

Further, it is determined by IR spectroscopy that the gel particles have an isocyanate group.

Then, a polymer compound having a hydrophilic group (second polymer compound) is combined with the thus obtained colored gel particles (first polymer gel) to form a semi IPN structure, in accordance with the method as described in Example 10.

1 part by weight of colored gel particles as prepared above, 3 parts by weight of silicone oil (trade name: KF-96L, 2cs, manufactured by Shin-Etsu Chemical Co., Ltd.), 3 parts by weight of tetrahydrofuran (THF), 1.5 parts by weight of a silicone monomer (SILAPLANE FM-0711, trade name, manufactured by Chisso Corporation), 0.5 parts by weight of 2-hydroxyethyl methacrylate (HEMA) and 0.02 parts by weight of azobisdimethylvaleronitrile as a polymerization initiator (V-65, trade name, manufactured by Wako Pure Chemical Industries, Ltd.) are mixed and thoroughly subjected to nitrogen replacement. Thereafter, the mixture is heated to 55° C. and allowed to polymerize for 5 hours. After the completion of polymerization, the obtained particles are filtered and washed with THF. The amount of the second polymer compound in the obtained particles that is combined with the first polymer gel as determined by thermogravimetric analysis is 30% by weight with respect to the amount of first polymer gel.

Further, it is determined by IR spectroscopy that the isocyanate groups disappear, showing that the first polymer gel is covalently bonded to the second polymer compound by reacting with HEMA having a hydroxyl group.

The obtained colored gel particles having a semi-IPN structure are left to stand for 24 hours in silicone oil (trade name: KF-96L, 2cs, manufactured by Shin-Etsu Chemical Co., Ltd.), and the volume average particle size at an equilibrium and swollen state as measured using a laser diffraction particle size distribution analyzer (HORIBA LA-300, trade name, manufactured by Horiba, Ltd.) is 11 µm. The amount of liquid absorption of the gel particles at an equilibrium and swollen state as measured from the change in dry weight is 3 g/g.

Further, in order to determine whether or not the second polymer compound that forms a semi-IPN structure is combined in a stable manner by covalent bonding, a comparative evaluation with respect to Example 10 is conducted. Namely, the evaluation is conducted by preparing a solution in which a predetermined amount of semi-IPN colored gel particles are dispersed in silicone oil, heating this dispersion to 100° C. for 48 hours, separating the supernatant liquid by centrifugation, and then determining the amount of the free polymer compound included in the supernatant liquid by mass measurement.

As a result, while 1% by weight of second polymer compound in the dried semi-IPN colored gel particles as prepared in Example 10 is free, no isolation of the second polymer compound is detected in the semi-IPN colored gel particles as prepared in Example 11. It is thus presumed that the semi-IPN colored gel particles as prepared in Example 11 achieve a more stable combination by means of the reaction of the second polymer compound with the isocyanate group.

(Evaluation)

A dispersion containing 2% by weight of the above semi-IPN colored gel particles in silicone oil (trade name: KF-96L, 2cs, manufactured by Shin-Etsu Chemical Co., Ltd.) as a dispersing medium is prepared, and the evaluation of electrophoretic properties is conducted in accordance with the method as described in Comparative Example 1.

As a result, the obtained particles are positively charged and exhibit a favorable electrophoretic property. Accordingly, it is found that dissociation of acid and base is achieved to a sufficient level.

Further, the charge amount ($\xi$ potential) of the gel particles is measured using a $\xi$ potential meter in accordance with the method as described in Comparative Example 1. As a result, the $\xi$ potential is as high as +100 mV.

On the other hand, aggregation of the gel particles is not observed even with a microscope, showing the excellent dispersion stability of the gel particles. This is assumed to be a characteristic of polymer gel that exhibits a sufficient amount of liquid absorption.

A display model device is prepared using the gel particles (electrophoretic particles) as prepared in the Examples as described above.

Two ITO glass substrates (5 cm×10 cm, 2 mm in thickness) are attached to each other via a space of 100 μm with the electrode substrate side facing each other, into an off-set structure in which part of the electrode surface is secured for wiring, and a tape spacer is formed on the peripheral portion (including an opening portion), thereby producing cell structures (empty cell).

Example 12

In Example 12, the gel particles (electrophoretic particles) as prepared in Example 1 are used.

Namely, a dispersion containing 2% by weight of the blue, negatively-charged electrophoretic particles as prepared in Example 1 in ISOPAR M is prepared, and white particles (polymer-coated titanium oxide particles, volume average particle diameter: 0.5 μm, manufactured by Sekisui Plastics Co., Ltd.) are dispersed therein.

This dispersion is injected into the cell (empty cell) from the opening portion by a decompression method. The opening portion is sealed and an optical device for evaluation is prepared.

To the obtained optical device, direct voltages of 10V of different polarities are applied. As a result, a blue color is displayed when the electric field polarity is positive at the display side, and a white color is displayed when the electric field polarity is negative at the display side, in an alternate manner. The display contrast as measured using X-RITE (trade name, manufactured by X-Rite, Incorporated) is as high as 20 or more, in terms of a ratio at a peak wavelength when a color is displayed. In order to evaluate the stability in repeated use, the contrast is evaluated before and after the alternating application of electric field for 100,000 times or more. As a result, degradation in contrast is not observed.

Example 13

In Example 13, gel particles (electrophoretic particles) as prepared in Example 8 are used.

Namely, a dispersion containing 2% by weight of the magenta, negatively-charged electrophoretic particles as prepared in Example 8 in silicone oil (trade name: KF-96L, 2cs, manufactured by Shin-Etsu Chemical Co., Ltd.) is prepared, and the white particles used in Example 12 (polymer-coated titanium oxide particles, volume average particle diameter: 0.5 μm, manufactured by Sekisui Plastics Co., Ltd.) are dispersed therein.

This dispersion is injected into the cell (empty cell) as prepared in Example 12 from the opening portion by a decompression method. The opening portion is sealed and an optical device for evaluation is prepared.

To the obtained optical device, direct voltages of 10V of different polarities are applied. As a result, a magenta color is displayed when the electric field polarity is positive at the display side, and a white color is displayed when the electric field polarity is negative at the display side, in an alternate manner. The display contrast as measured using X-RITE (trade name, manufactured by X-Rite, Incorporated) is as high as 20 or more, in terms of a ratio at a peak wavelength when a color is displayed. In order to evaluate the stability in repeated use, the contrast is evaluated before and after the alternating application of electric field for 100,000 times or more. As a result, degradation in contrast is not observed.

Example 14

In Example 14, gel particles (electrophoretic particles) as prepared in Example 10 are used.

Namely, a dispersion containing 2% by weight of the blue, positively-charged electrophoretic particles as prepared in Example 8 in silicone oil (trade name: KF-96L, 2cs, manufactured by Shin-Etsu Chemical Co., Ltd.) is prepared, and the white particles used in Example 12 (polymer-coated titanium oxide particles, volume average particle diameter: 0.5 μm, manufactured by Sekisui Plastics Co., Ltd.) are dispersed therein.

This dispersion is injected into the cell (empty cell) as prepared in Example 12 from the opening portion by a decompression method. The opening portion is sealed and an optical device for evaluation is prepared.

To the obtained optical device, direct voltages of 10V of different polarities are applied. As a result, a blue color is displayed when the electric field polarity is negative at the display side, and a white color is displayed when the electric field polarity is positive at the display side, in an alternate manner. The display contrast as measured using X-RITE (trade name, manufactured by X-Rite, Incorporated) is as high as 20 or more, in terms of a ratio at a peak wavelength when a color is displayed. In order to evaluate the stability in repeated use, the contrast is evaluated before and after the alternating application of electric field for 100,000 times or more. As a result, degradation in contrast is not observed.

All publications, patent applications, and technical standards mentioned in this specification are herein incorporated by reference to the same extent as if each individual publication, patent application, or technical standard was specifically and individually indicated to be incorporated by reference.

TABLE 1

| | First polymer gel Main monomer | Second polymer compound Main monomer | Second polymer compound Monomer with hydrophilic group | Structure | Dispersing medium | Particles for display Size (μm) | Liquid absorption (g/g) | Porality | ξ potential (mV) | Evaluation Electrophoretic movement* |
|---|---|---|---|---|---|---|---|---|---|---|
| Com. Ex. 1 | Stearyl methacrylate | — | — | — | ISOPAR M | 9.6 | 2 | Positive & negative | +2 | N |
| Com. Ex. 2 | Stearyl methacrylate | — | — | — | Silicone oil | 6 | less than 0.1 | Positive & negative | 0 | N |
| Com. Ex. 3 | Stearyl methacrylate | — | — | With additive | ISOPAR M | 9.6 | 2 | Positive & negative | −5 | N |
| Ex. 1 | Stearyl methacrylate | Stearyl methacrylate | HEMA | Semi IPN | ISOPAR M | 10 | 2 | Negative | −40 | A |
| Ex. 2 | Stearyl methacrylate | Stearyl methacrylate | M90G | Semi IPN | ISOPAR M | 10 | 2 | Negative | −30 | A |
| Com. Ex. 4 | Stearyl methacrylate | — | — | — | ISOPAR M | 9.6 | 2 | Almost positive | +4 | N |
| Com. Ex. 5 | Stearyl methacrylate | — | — | — | Silicone oil | 6 | less than 0.1 | Slightly positive | +2 | N |
| Ex. 3 | Stearyl methacrylate | Stearyl methacrylate | HEMA | Semi IPN | ISOPAR M | 10 | 2 | Positive | +80 | A |
| Ex. 4 | Stearyl methacrylate | Stearyl methacrylate | M90G | Semi IPN | ISOPAR M | 10 | 2 | Positive | +60 | A |
| Ex. 5 | Stearyl methacrylate | Stearyl methacrylate | HEMA | IPN | ISOPAR M | 10 | 2 | Positive | +80 | A |
| Ex. 6 | Stearyl methacrylate | Stearyl methacrylate | HEMA | Semi IPN + chemical bond | ISOPAR M | 11 | 2.5 | Positive | +85 | A |

*A: acceptable, N: not acceptable

TABLE 2

| | First polymer gel Main monomer | Second polymer compound Main monomer | Second polymer compound Monomer with hydrophilic group | Structure | Dispersing medium | Particles for display Size (μm) | Liquid absorption (g/g) | Porality | ξ potential (mV) | Evaluation Electrophoretic movement* |
|---|---|---|---|---|---|---|---|---|---|---|
| Com. Ex. 6 | Difunctional silicone | — | — | — | Silicone oil | 9.5 | 2 | Positive & negative | −5 | N |
| Ex. 7 | Difunctional silicone | Monofunctional silicone | HEMA | Semi IPN | Silicone oil | 10 | 2 | Negative | −30 | A |
| Ex. 8 | Difunctional silicone | Monofunctional silicone | M90G | Semi IPN | Silicone oil | 10.2 | 2 | Negative | −35 | A |
| Ex. 9 | Difunctional silicone | Monofunctional silicone | M90G | IPN | Silicone oil | 10.2 | 2 | Negative | −40 | A |
| Com. Ex. 7 | Monofunctional silicone | — | — | — | Silicone oil | 9.5 | 2 | Slightly positive | +3 | N |
| Ex. 10 | Monofunctional silicone | Monofunctional silicone | HEMA | Semi IPN | Silicone oil | 11 | 3 | Positive | +90 | A |
| Ex. 11 | Monofunctional silicone | Monofunctional silicone | HEMA | Semi IPN + chemical bond | Silicone oil | 11 | 3 | Positive | +100 | A |

*A: acceptable, N: not acceptable

What is claimed is:

1. Particles for display comprising a colorant, a first polymer gel having a charging group and a second polymer compound having a hydrophilic group, the first polymer gel and the second polymer compound forming an IPN structure or a semi-IPN structure.

2. The particles for display according to claim 1, wherein the second polymer compound comprises a polymer gel.

3. The particles for display according to claim 1, wherein the first polymer gel and the second polymer compound form a semi-IPN structure, and wherein the first polymer gel and the second polymer compound are chemically bonded to each other.

4. The particles for display according to claim 1, wherein the first polymer gel comprises a crosslinked silicone polymer or a crosslinked long-chain alkyl polymer.

5. A particle dispersion for display comprising the particles for display according to claim 1, and a dispersing medium in which the particles for display are dispersed.

6. The particle dispersion for display according to claim 5, wherein the second polymer compound comprises a polymer gel.

7. The particle dispersion for display according to claim 5, wherein the first polymer gel and the second polymer compound form a semi-IPN structure, and wherein the first polymer gel and the second polymer compound are chemically bound to each other.

8. The particle dispersion for display according to claim 5, wherein the first polymer gel comprises a crosslinked silicone polymer or a crosslinked long-chain alkyl polymer.

9. The particle dispersion for display according to claim 5, wherein the amount of the dispersing medium that is absorbed by the particles for display at an equilibrium and swollen state is from about 0.1 g/g to about 50 g/g.

10. The particle dispersion for display according to claim 5, wherein the dispersing medium comprises a paraffin-based solvent or a silicone oil.

11. A display medium comprising:
   a pair of substrates, at least one of the pair of substrates being transparent; and
   the particle dispersion for display according to claim 5 that is included in a space between the pair of substrates.

12. The display medium according to claim 11, wherein the second polymer compound comprises a polymer gel.

13. The display medium according to claim 11, wherein the first polymer gel and the second polymer compound form a semi-IPN structure, and wherein the first polymer gel and the second polymer compound are chemically bonded to each other.

14. The display medium according to claim 11, wherein the first polymer gel comprises a crosslinked silicone polymer or a crosslinked long-chain alkyl polymer.

15. The display medium according to claim 11, wherein the amount of the dispersing medium that is absorbed by the particles for display at an equilibrium and swollen state is from about 0.1 g/g to about 50 g/g.

16. The display medium according to claim 11, wherein the dispersing medium comprises a paraffin-based solvent or a silicone oil.

17. A display device comprising:
   a pair of substrates, at least one of the pair of substrates being transparent;
   the particle dispersion for display according to claim 5 that is included in a space between the pair of substrates; and
   a voltage applying unit that applies a voltage to the pair of substrates.

18. The display device according to claim 17, wherein the second polymer compound comprises a polymer gel.

19. The display device according to claim 17, wherein the first polymer gel and the second polymer compound form a semi-IPN structure, and wherein the first polymer gel and the second polymer compound are chemically bonded to each other.

20. The display device according to claim 17, wherein the amount of the dispersing medium that is absorbed by the particles for display at an equilibrium and swollen state is from about 0.1 g/g to about 50 g/g.

* * * * *